United States Patent [19]

Morita et al.

[11] 4,445,182
[45] Apr. 24, 1984

[54] METHOD OF CONTROL OF NC MACHINE TOOLS

[75] Inventors: Eiichi Morita, Osaka; Yoshihisa Kato; Koichi Takeda, both of Takarazuka; Takuya Oku, Ikeda, all of Japan

[73] Assignee: Daihatsu Motor Company, Limited, Osaka, Japan

[21] Appl. No.: 253,854

[22] PCT Filed: Sep. 24, 1980

[86] PCT No.: PCT/JP80/00214
§ 371 Date: Apr. 2, 1981
§ 102(e) Date: Apr. 2, 1981

[87] PCT Pub. No.: WO81/01061
PCT Pub. Date: Apr. 16, 1981

[30] Foreign Application Priority Data

Oct. 2, 1979 [JP] Japan .................. 54-127593
Oct. 9, 1979 [JP] Japan .................. 54-130543

[51] Int. Cl.³ .............. G06F 15/46; G05B 19/18
[52] U.S. Cl. .................. 364/474; 318/572; 364/170; 364/171
[58] Field of Search ............ 364/474, 475, 170, 171; 318/569, 570, 572; 82/2 B

[56] References Cited

U.S. PATENT DOCUMENTS

| | | | |
|---|---|---|---|
| 3,665,280 | 5/1972 | Payne | 364/170 X |
| 3,783,253 | 1/1974 | Anderson et al. | 364/171 X |
| 4,033,206 | 7/1977 | Morita et al. | 82/2 B |
| 4,074,349 | 2/1978 | Ueda | 364/171 X |
| 4,136,390 | 1/1979 | Farrell et al. | 364/171 X |
| 4,152,765 | 5/1979 | Weber | 364/171 X |
| 4,229,804 | 10/1980 | Kobayashi et al. | 364/474 X |

*Primary Examiner*—Joseph F. Ruggiero
*Attorney, Agent, or Firm*—Armstrong, Nikaido, Marmelstein & Kubovcik

[57] ABSTRACT

A method of control of NC machine tools of the type wherein all control data necessary for preparing machining data is inputted into a control device by key switches provided on an operating board. The data necessary for machining a workpiece stored in a microcomputer contained in the NC machine is reduced to the lowest minimum, while various data, such as the paths of movement of tools during rough machining, rough finish machining and finish machining, actually needed for machining the workpiece are successively computed on the basis of the data stored in said microcomputer in advance. Thus, data associated with a variety of workpieces can be processed with a minimum of memory capacity, and complicated shapes having concaves and convexes can accurately be machined in a simple operation.

6 Claims, 51 Drawing Figures

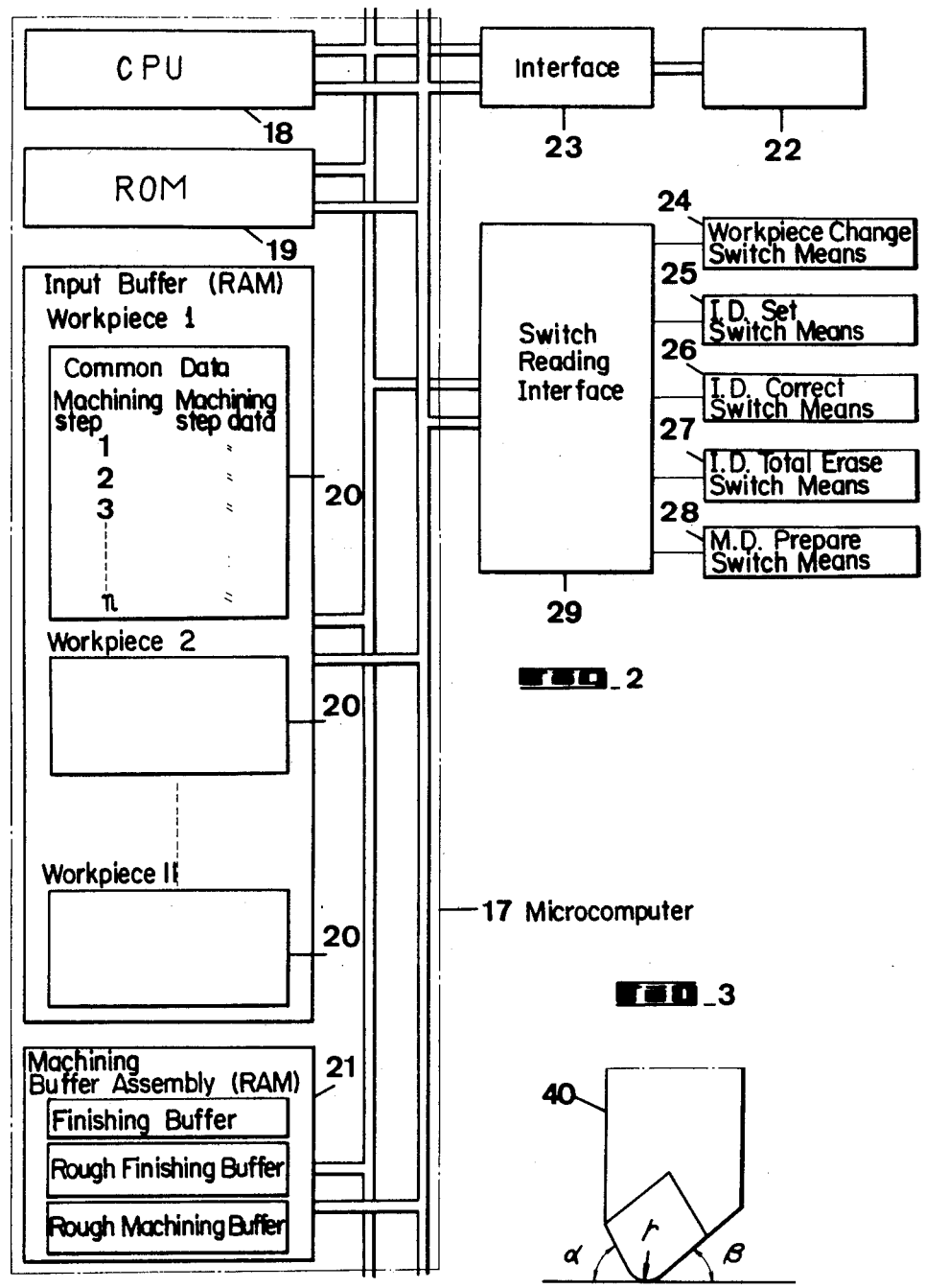

FIG_4
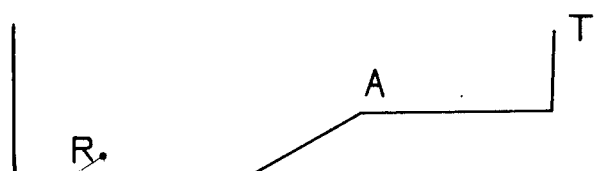
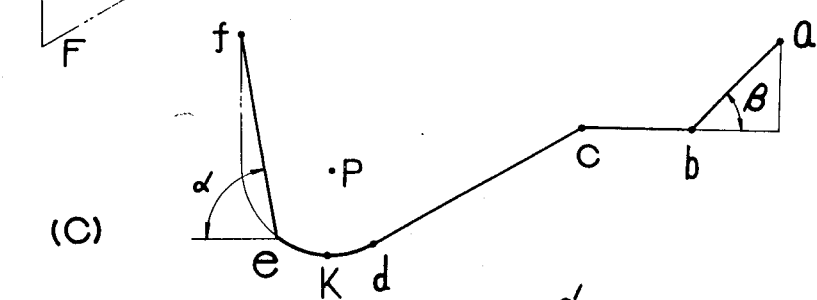
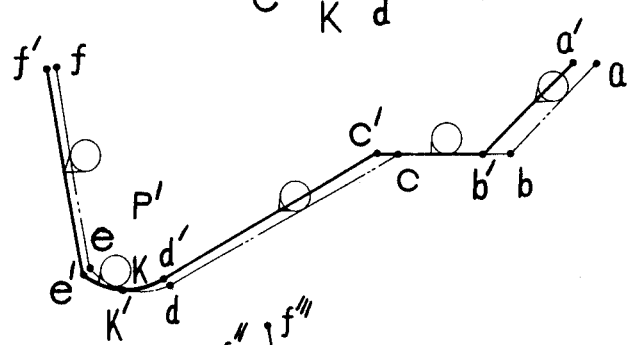
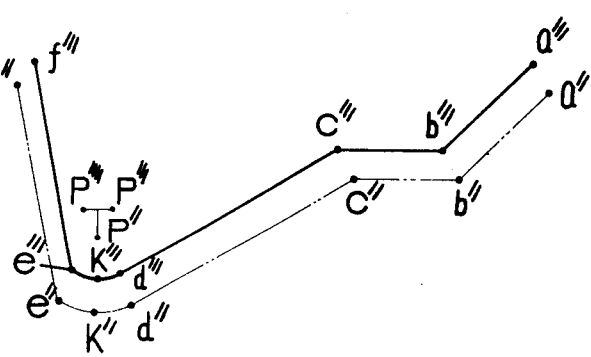
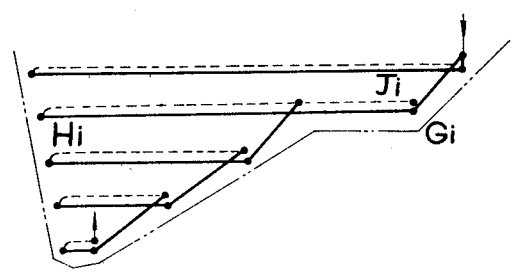

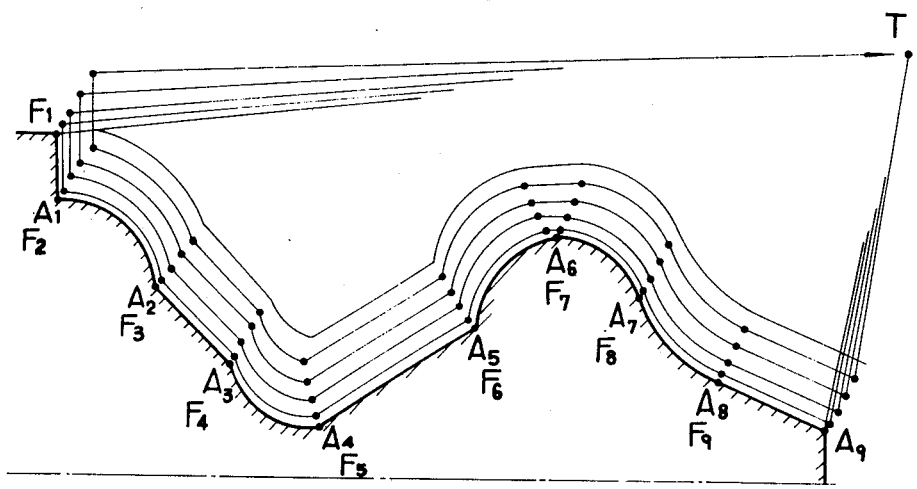
FIG_5
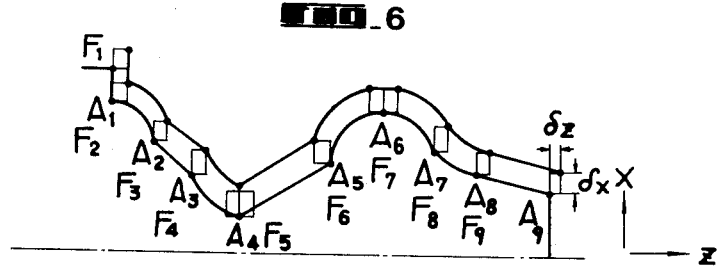
FIG_6
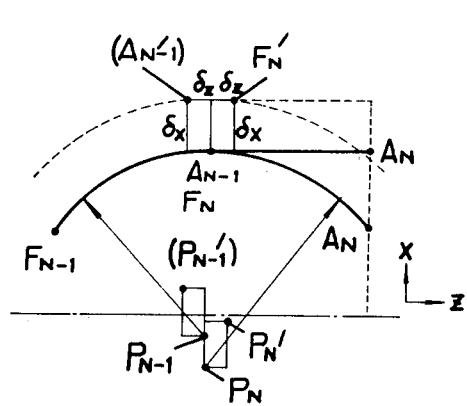
FIG_7
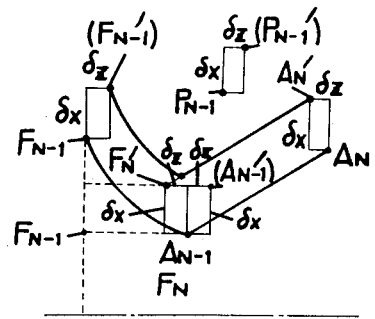
FIG_8

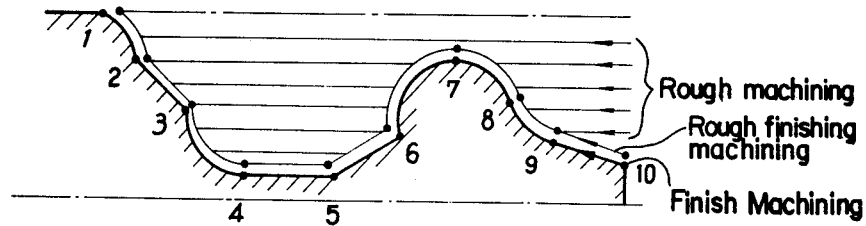
FIG.12
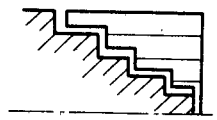
FIG.13
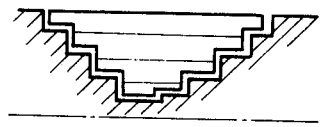
FIG.14
FIG.15

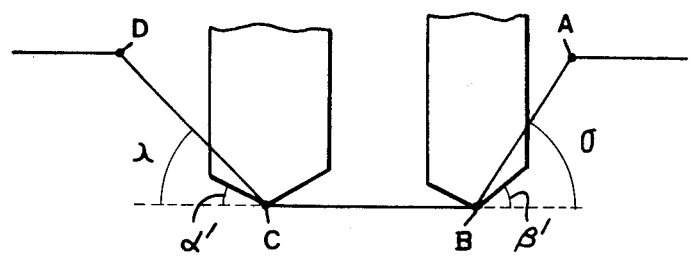
FIG_33
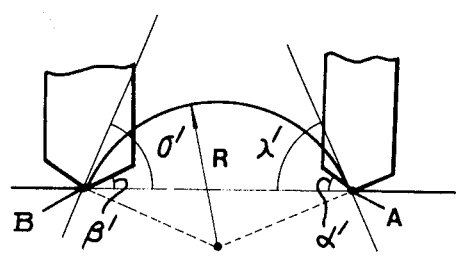
FIG_34
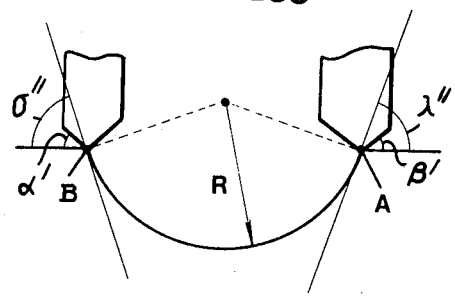
FIG_35

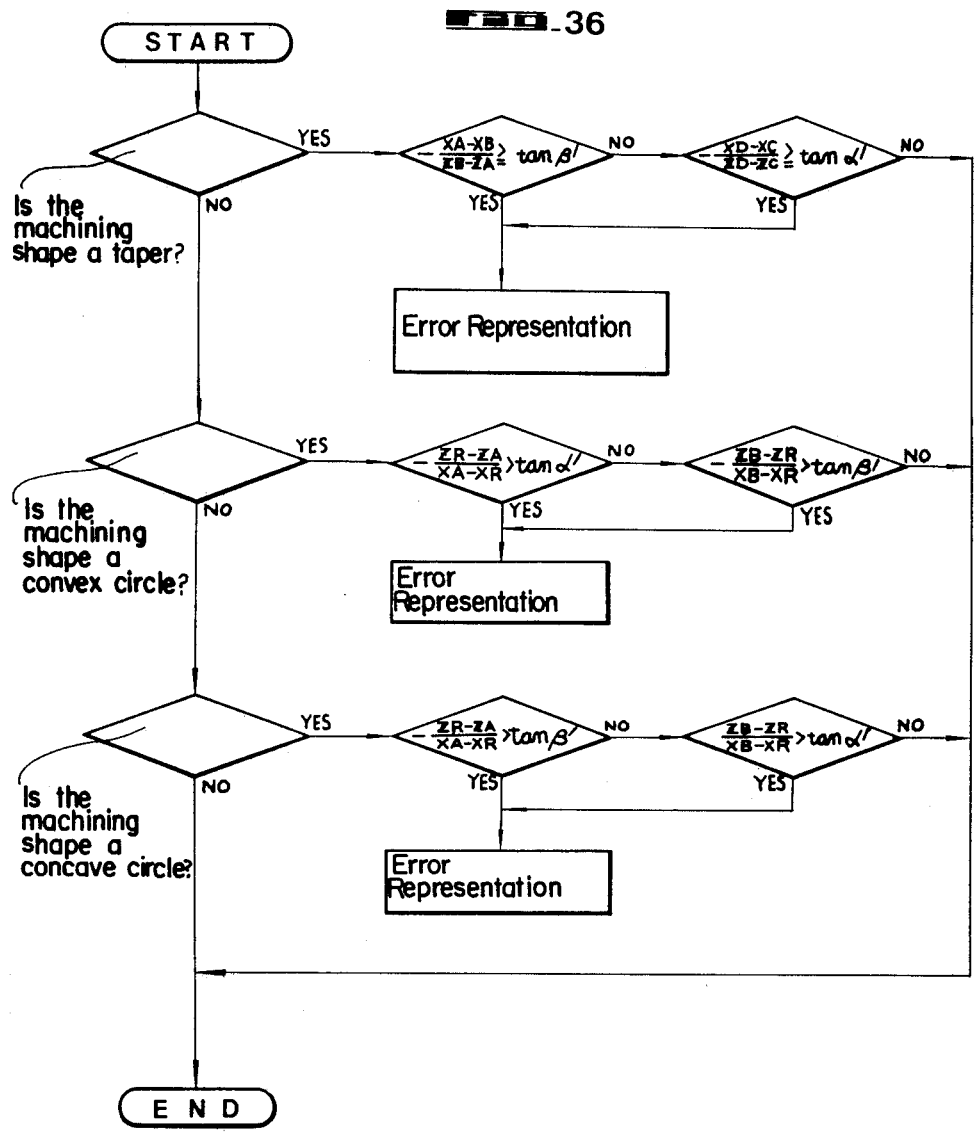

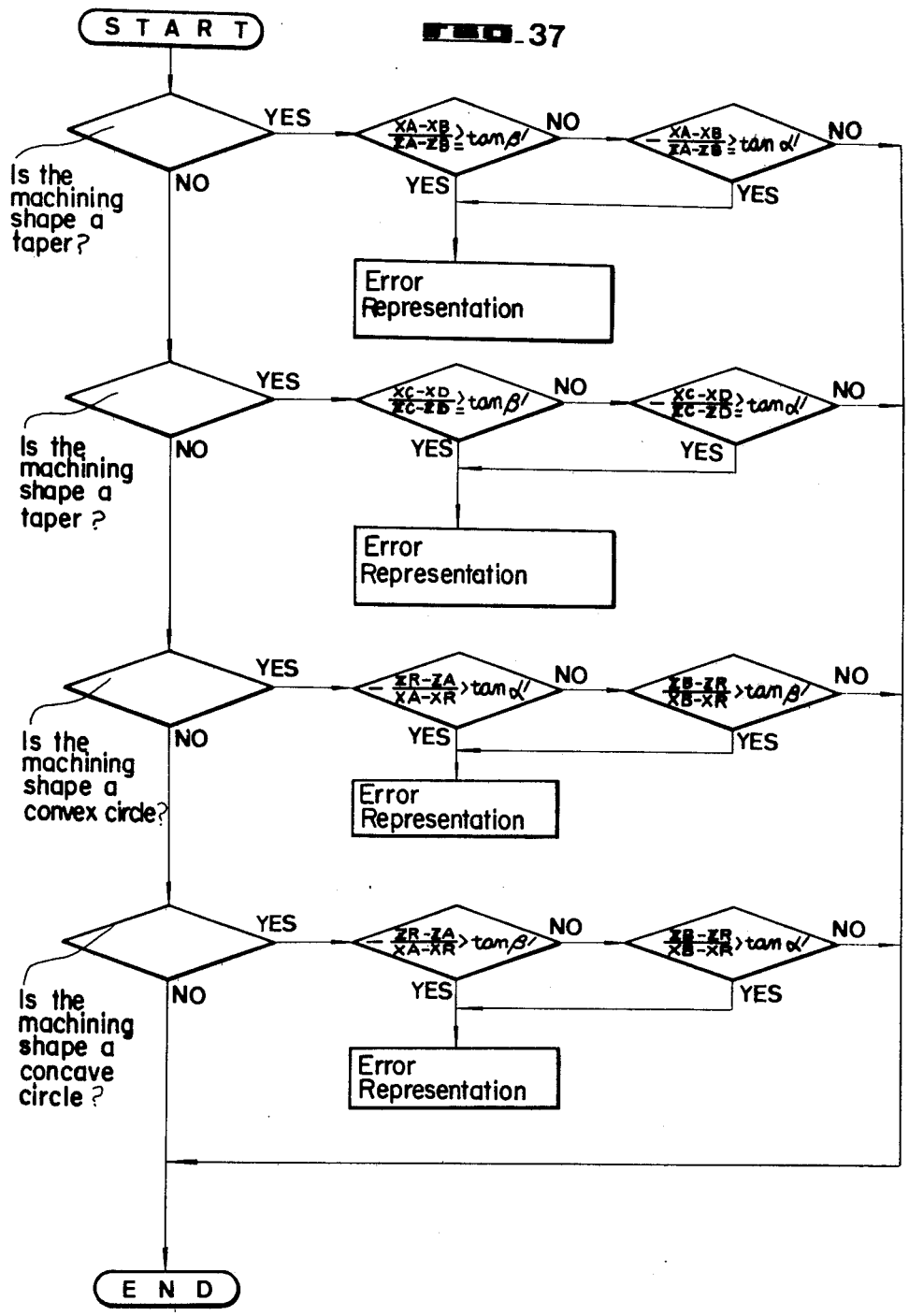

METHOD OF CONTROL OF NC MACHINE TOOLS

FIELD OF THE INVENTION

The present invention relates to a method of control of machine tools of the type wherein the actual movement of the machine is automatically computed by inputting the machining shape and finish size of the workpiece and machining conditions by means of key switches attached to an operating board, whereupon the machine is controlled on the basis of the results of computations.

BACKGROUND OF THE INVENTION

Conventional NC machines are classified into three types, namely, one in which all control data is inputted in the form of punched tapes, another in which data to be punched is inputted by keying, and the other in which actual machining is performed and the data resulting therefrom is stored. However, the first two types necessitate programing in detail the movement of the object to be controlled by using a particular NC language and take much labor and time in preparing punched tapes and also present problems in tool setting. In the third type, the skill of the operator in doing the actual work greatly influences the subsequent operation and there are various disadvantages in the control operation, so that this type has not been in wide use.

Thus, the applicant has previously proposed a device described in U.S. Pat. No. 4,033,206 as means for eliminating the drawbacks described above. This device is characterized by effecting the inputting of data by digital switches rather than by tapes, minimizing the number of steps of inputting data and simplifying the inputting operation. To this end, the device is so arranged that the machining shape and finishing shape and size to be imparted to the blank and machining conditions are inputted, with the mode for movement of the tool being fixed. The advent of this type of device has completely eliminated the drawbacks in the prior art.

SUMMARY OF THE INVENTION

The present invention relates to improvements in a method of control of said device.

An object of the invention is to provide a control method characterized in that the data necessary for machining work to be stored in a microcomputer contained in said device is reduced to a minimum necessary for machining shape and finishing shape position, while various data actually required during machining of work, such as the path of movement of the tool during rough machining, the path of movement of the tool during rough finish machining, and the path of movement of the tool during finish machining, is successively computed on the basis of data stored in a microcomputer. The processing of data associated with a variety of workpieces can be performed with a minimum of stored data.

Another object of the invention is to provide a control method wherein by simply inputting data on finishing shape and size into said microcomputer, the latter automatically computes the rough finish machining size and rough machining size to perform the required machining.

A further object of the invention is to provide a control method which makes it possible, in a simple operation, to machine complicated shapes having concaves and convexes.

An additional object of the invention is to provide a control method wherein data on the machining shape to be inputted into said computer is automatically corrected according to the shape of the cutting edge of the tool used for that machining.

Yet another object of the invention is to provide a control method wherein the operator causes said computer to decide whether the shape of the cutting edge of a tool and the machining shape of a workpiece, on which data is inputted into said computer, are appropriate or not.

Still a further object of the invention is to provide a control method wherein two successive machining steps can be accurately performed with two kinds of tools which are different in nose diameter.

By achieving these objects, it is possible to facilitate and make accurate the control of devices of this kind and provide improved performance.

The arrangement of the invention will become more apparent from the following detailed description of embodiments of the invention shown in the accompanying drawings.

BRIEF DESCRIPTION OF THE DRAWINGS

FIG. 2 is a block diagram showing a concrete circuit arrangement according to the present invention;

FIG. 3 is a diagram showing the shape of the tip of a tool;

FIGS. 4(a) through (e) are diagram showing a process, at successive stages, in which CPU (computer) prepares a machining buffer on the basis of data from an input buffer;

FIG. 5 is a diagram showing an example of a machining shape in copy-machining;

FIG. 6 is a diagram showing how to find a rough finish line from a finish machining shape in copy-machining;

FIG. 7 is a diagram showing linear interpolation in copy-machining;

FIG. 8 is a diagram showing computation of an intersection in copy-machining;

FIG. 12 is a diagram showing an example of a machining shape of a cylindrical workpiece which can be machined according to the invention;

FIG. 13 is a diagram showing an example of an open type machining shape of a cylindrical workpiece according to the invention;

FIG. 14 is a diagram showing an example of an on-the-way concave type machining shape of a cylindrical workpiece according to the invention;

FIG. 15 is a diagram showing a movement instruction pattern for a tool in rough machining of a cylindrical workpiece;

FIGS. 30 through 35 are diagrams showing applications of the method of the invention to various shapes;

FIG. 36 is a flow chart which brings about a decision that machining is impossible;

FIG. 37 is another flow chart which brings about a decision that machining is impossible;

DESCRIPTION OF THE PREFERRED EMBODIMENTS

Figures 1A, 1B:
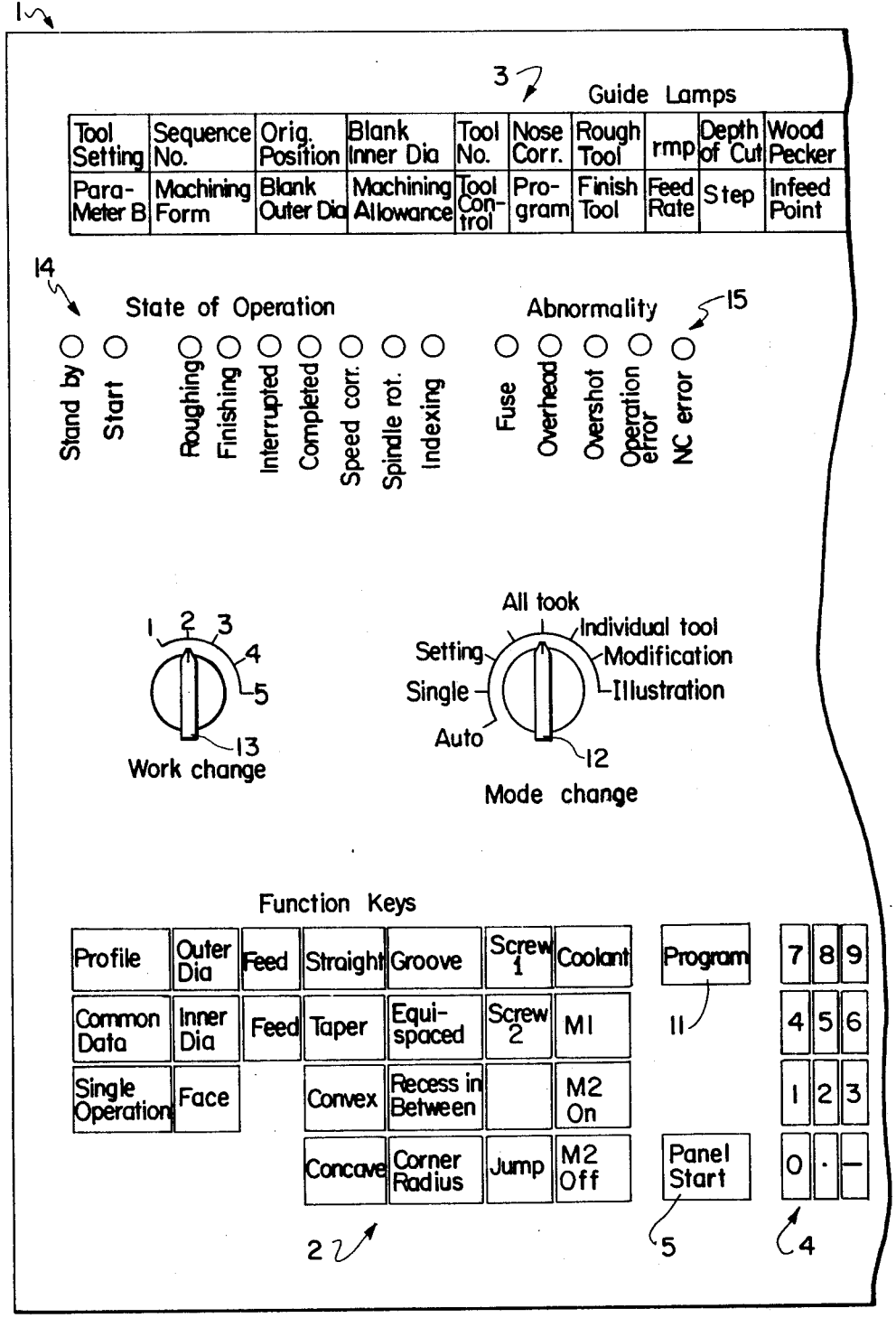
FIG. 1 illustrates an example of an operation board for inputting data necessary for the machining according to this invention.
Figure 1B:
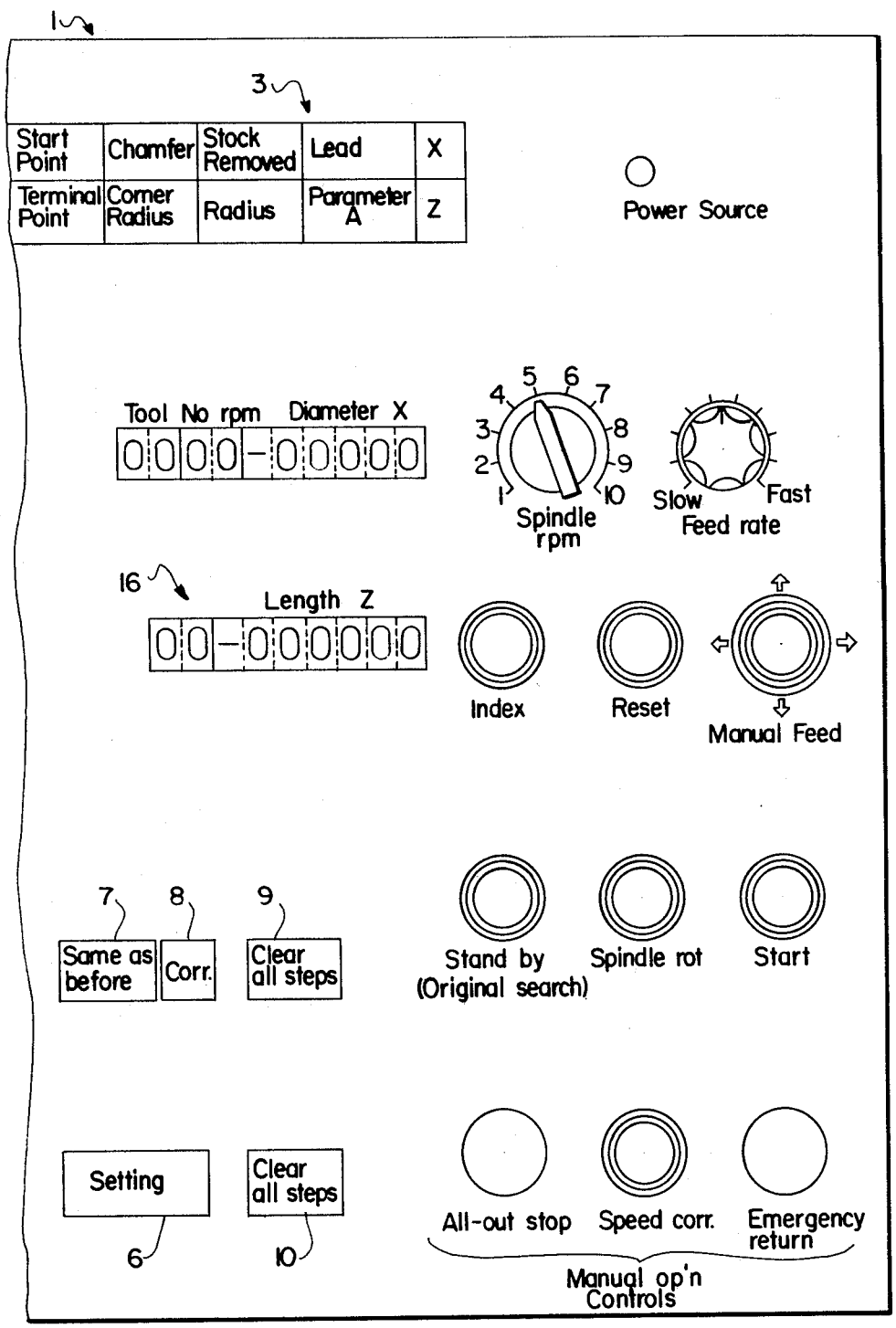

FIG. 1 shows an example of the operating board of a control device which embodies the NC control method of the present invention, illustrating the overall relation of the invention in a readily understandable manner. The numeral 2 denotes function keys arranged on an operating board or control panel 1 for designating a shape to be machined on the lathe; 3 denotes guide lamps for reporting to the operator what kind of data is actually required according to a machining shape which is designated by said function keys. The function keys and guide lamps are labeled in everyday language. The numeral 4 denotes ten-keys to be used when inputting required numerical values according to the indication given by said guide lamps 3. The numeral 5 denotes a panel start key used to cause the microcomputer to output an operation start signal and 6 denotes a setting key used to store data in the microcomputer after said data has been inputted by manipulating the function keys 2 or ten-keys 4. The numeral 7 denotes a "same-as-before" key which is used when a workpiece which is to be machined into a predetermined shape has so complicated a machining shape that the data necessary for machining must be inputted into the microcomputer in some steps rather than at one time and when numerical values indicated by the guide lamps 3 which light up at the time of inputting of data for the nth machining step are the same as the numerical values in the same item for the (n−1)th machining step. When the key 7 is depressed, numerical values inputted in the same item for the (n−1)th machining step are guided and concurrently therewith such values are indicated on a indicator 16 to be later described. The numeral 8 denotes a correction key used to correct the data which has just been set; 9 denotes an all-data clear key used to clear all data inputted into the microcomputer; and 10 denotes a one-machining-step clear key used to clear that portion of the data inputted into the microcomputer which corresponds to one machining step. The numeral 11 denotes a program key used to give instructions for computation and storage of various data necessary for actually controlling the machine after the necessary data has been inputted; 12 denotes a mode changeover switch used to make shift between manual operation and automatic operation of the lathe; and 13 denotes a workpiece changeover switch used to read out that portion of the data stored in advance for a different workpiece which corresponds to the data for the workpiece to be machined this time, so as to automatically effect the machining of said workpiece. The numeral 14 denotes condition indicating lamps for indicating the operation condition of the lathe; 15 denotes abnormality indicating lamps for indicating abnormality when abnormality is produced in any of various devices; and 16 denotes an indicator for indicating values inputted by manipulating the ten-keys 4. Further, a group of switches shown at the right-hand side of FIG. 1 are used when it is desired to operate the lathe by hand.

The present invention relates to a method of control of NC machine tools having such data inputting means.

Referring to FIG. 2 which is a flow chart illustrating a circuit arrangement for embodying a control method according to the invention, a microcomputer 17 comprises a CPU 18, a ROM 19, input buffers 20, and a machining buffer assembly 21. The numeral 22 denotes a lathe connected to the microcomputer 17 through an interface 23 for NC machine tools. There are N said input buffers 20, and data on an associated workpiece will be inputted into each input buffer 20 by input setting switch means to be later described. Data to be inputted into each input buffer 20 is classified into common data and machining step data for each machining step. The common data comprises original position (for indexing a tool), finishing allowance δ, and, as shown in FIG. 3, angle of cut α, endcutting-edge angle β and nose radius r of a tool 40 which are associated with a predetermined tool number. The machining step data comprises machining shape, X and Z coordinates of a point of cut, X and Z coordinates of a start point, X and Z coordinates of an end point, radius R with which to cut a corner, amount of cut γ, finishing tool number m, rough machining tool number m', RPM N, and feed speed V. In addition, if the shape of a workpiece to be machined is too complicated to input data on such machining shape at one time by input data (I.D.) setting switch means 25 to be later described, it can be inputted in steps. Each input buffer 20 is capable of storing input data (I.D.) for up to n machining steps. The machining buffer assembly 21 comprises a finish machining buffer, a rough finish machining buffer, and a rough machining buffer. Data on the path of movement of a tool during finish machining, the path of movement of a tool during rough finish machining and the path of movement of a tool during rough machining, which is computed by the CPU 18 on the basis of the data inputted into the input buffer 20, can be inputted into the individual buffers of the machining buffer assembly 21. In addition, there is only one machining buffer assembly 21 irrespective of the number of input buffers 20, so that each time the kind of a workpiece to be machined is changed and data computed by the CPU 18 on the basis of the data stored in advance in the input buffer 20 associated with said workpiece is changed, the data stored in the machining buffer assembly 21 is rewritten. The numeral 24 denotes workpiece changing switch means for designating a particular one of the N input buffers 20 in which data should be stored or data stored in a particular one of the N input buffers which should be read out. The numeral 25 denotes input data setting switch means used when it is desired to input data into the input buffer 20 designated by the workpiece changing switch means 24. The numeral 26 denotes input data correcting switch means used when it is desired to correct the data which has just been inputted by the input data setting switch means 25. The numeral 27 denotes input data totally erasing switch means for cancelling all the data inputted into the input buffers 20. The numeral 28 denotes machining data (M.D.) preparing switch means used when it is desired to cause the CPU 18 to compute on the basis of data stored in the input buffer 20 and to store the resulting data in the machining buffer assembly 21. These switch means are arranged on an operating board (see FIG. 1) and connected to the microcomputer 17 through a switch reading interface 29.

Referring to FIGS. 4(a) through (e), there will now be outlined a method of preparing the machining buffer assembly 21 from particular machining step data selected from the data stored in the input buffers 20 by manipulating the input data setting switch means 25.

FIG. 4(a) shows a basic shape obtained when data on a machining shape, a start point T, an end point F and a radius R are inputted into an input buffer 20. After such data for the basic shape has been inputted into the input buffer 20, the machining data switch means 28 is depressed, whereupon the CPU 18 computes the center P of the arc, the apex K of the arc and the point of contact d between the taper and arc, as shown in FIG. 4(b). Of the cutting angles αm and αm' of a finishing tool m and a roughing tool m', respectively, designated in advance, the smaller one is named α, while of the end-cutting-edge angles βm and βm' of the finishing tool m and roughing tool m', respectively, the smaller one is named β. Then, intersections b and e are computed from α and β, respectively, to find a machining shape which can be actually machined on the lathe by the tool designated in advance. Nose radius compensation is then made with the nose radius rm of the finishing tool m as shown in FIG. 4(c), and a path a', b', c', d', K', e', f', P' for actual movement of the finishing tool m is computed for machining to provide the shape computed in FIG. 4(b). Further, the radius of the arc is changed to R-rm. Thus, a finishing buffer is prepared. Subsequently, as shown in FIG. 4(d), nose radius compensation is made with the nose radius rm' of the roughing tool, and a path a'', b'', c'', d'', K'', e'', f'', P'' for temporary movement of the roughing tool is computed for machining to provide the shape computed in FIG. 4(b) and the radius of the arc is changed to R—rm'. Further, rough machining points a''', b''', c''', d''', K''', e''', f''', P''', P'''' which provide a finishing allowance δ are computed from the path of movement of the roughing tool m', so as to prepare a rough finishing buffer. Finally, as shown in FIG. 4(e), rough machining points Gi, Hi, Ji which provide a finishing allowance δ are computed from the rough finishing points, so as to prepare a rough finishing buffer. In addition, in cases where this rough machining is performed by reciprocating the roughing tool m' n times, as shown in FIG. 4(e), calculations for finding all successive values of Hi, Ji and Gi for the complete operation and storing all of them in the rough finishing buffer are not performed, but insted values of Hi, Gi, Ji for only the first step are calculated and stored in the rough finishing buffer, and the CPU, when shifted the next time, makes successive computations on the basis of the data calculated the preceding time and the results are stored in the rough finishing buffer so as to successively update the contents of the rough finishing buffer, so that a small memory capacity is sufficient to provide for an infinite number of times of rough machining. The above operation is listed below.

| Input Buffer (for one machin'g step) Machin'g shape | Machining buffer (for one machining step) | | |
| --- | --- | --- | --- |
| | Finishing buffer | Rough finish'g buffer | Rough machin'g buffer |
| X(T) | X(a') | X(a''') | X(Gi − 1) |
| Z(T) | Z(a') | Z(a''') | X(Gi) |
| X(A) | X(b') | X(b''') | Z(Gi) |
| Z(A) | Z(b') | Z(b''') | X(Hi) |
| X(F) | X(c') | X(c''') | Z(Hi) |
| Z(F) | Z(c') | Z(c''') | X(Ji) |
| R | X(d') | X(d''') | Z(Ji) |
| γ | Z(d') | Z(d''') | |
| m | X(K') | X(K''') | |
| m' | Z(K') | Z(K''') | |
| N | X(e') | X(e''') | |
| V | Z(e') | Z(e''') | |
| | X(f') | X(f''') | |
| | Z(f') | Z(f''') | |
| | X(P') | X(P''') | |
| | Z(P') | Z(P''') | |
| | R-rm | X(P'''') | |
| | | Z(P'''') | |
| | | R-rm' | |

Once the CPU 18 performs computations on the basis of the data stored in the input buffer 20 to complete the data in the machining buffer assembly 21, the lathe is automatically controlled by the data in the machining buffer assembly 21 and the workpiece is machined to the predetermined shape.

Thus, only a minimum of data necessary for machining is stored in the input buffer 20, and the path of movement of the tool necessary for actual machining is computed each time by the CPU 18 on the basis of the data in the input buffer 20 and the results of computations are stored in the machining buffer assembly 21. According to such arrangement, as can be seen in the above list, the stored contents of the input buffer 20 are greatly reduced, and since a single machining buffer assembly 21 is sufficient irrespective of the number of input buffers 20, a variety of workpiece machining shapes can be stored in the microcomputer 17 at a time.

When it is desired to increase the storage capacity of each input buffer 20, a separate CPU for work number detection may be provided besides the CPU 18 for preparing the machining buffer assembly 21 on the basis of data from the input buffer 20, said workpiece number detecting CPU being connected to the input buffer 20. Thus, when a transfer instruction from the CPU 18 is fed into the workpiece number detecting CPU, the data stored in the input buffer 20 is transferred to the CPU 18. In this way, the memory can be increased to the extent which is allowed by the workpiece number detecting CPU, irrespective of the address capacity of the CPU 18.

As can be understood from the foregoing description, according to the method described above, the data necessary for machining a workpiece can be stored by using a minimum of storage capacity, so that the data necessary for machining a variety of workpieces can be stored in the microcomputer at the same time. As a result, in a diversified small-quantity production shop, when it is desired to repeatedly produce a plurality of limited workpieces, it is only necessary to store data concerning respective workpieces once in the microcomputer. In so doing, the machining of a particular workpiece can be performed by simply manipulating switches to read out the data corresponding to that workpiece. Thus, there is no need to re-store data each time the kind of a workpiece is changed, as in the past, thereby increasing productivity. Further, when the data corresponding to a particular workpiece must be stored in the microcomputer, it is only necessary to input necessary minimum data, greatly facilitating the data inputting operation. Further, even if the machining shape of a workpiece is so complicated as to exceed the number of machining steps permitted by one input buffer, this can be dealt with by inputting the workpiece number into a plurality of input buffers. In so doing, it is possible to handle or accommodate the number of machining steps n permitted by one input buffer multiplied by the number of input buffers N (i.e., n×N) by simply manipulating the workpiece change switch means and the machining buffer preparing switch means.

A method of preparing the machining buffer assembly 21 outlined above will now be described by taking an example of copy-machining a complicated shape having concaves and convexes as shown in FIG. 5.

As described above, each input buffer has a memory section for storing a set of amounts of cut $\gamma_x$, $\gamma_z$, a set of machining allowances Lx, Lz, a set of finishing allowances $\delta_x$, $\delta_z$ and a point of cut T, irrespective of the number of machining steps. (The suffixes x and z denote x and z coordinates, respectively. Hereinafter the same.) The finishing buffer has a memory section for storing a machining shape, a start point A, an end point F, a center point P, a radius R and other data (including RPM and feed), for each machining step.

The rough finishing buffer is the same in arrangement as said finishing buffer.

The rough finishing buffer has a memory section for storing a set of rough machining finish allowances $\delta_{xi}$, $\delta_{zi}$, a roughing start point Ai, a roughing end point Fi, and a roughing center point Pi, irrespective of the number of machining steps.

The input data described above refers to items for machining pattern, finish machining size and input buffer.

The machining shape pattern is divided into three parts, a straight line, a convex arc and a concave arc. Where the finish shape contour of a workpiece is resolvable into a combination of straight lines, convex arcs and concave arcs, data on a straight line is inputted at the coordinates of the start and end points thereof and the coordinates of the start and end points and the radius of a covex or concave arc are inputted.

The coordinates are expressed by taking the origin at the right-hand end of a workpiece, with the Z axis extending axially of the workpiece and with the X axis extending at right angles thereto. This method allows the direct use of the finish machining size of a workpiece.

A concrete example of inputting data on said machining shape pattern and finish machining size will now be described with reference to FIG. 5. The contour is divided, starting at the left-hand end, into a straight line, a convex arc and a concave arc, and the data is inputted for separate machining steps, as follows.

| Machining Step No. | Pattern | Start Point | End Point | Radius |
|---|---|---|---|---|
| 1 | Straight line | $A_1$ | $F_1$ | |
| 2 | Convex arc | $A_2$ | $F_2$ | $R_2$ |
| 3 | Straight line | $A_3$ | $F_3$ | |
| 4 | Concave arc | $A_4$ | $F_4$ | $R_4$ |
| 5 | Straight line | $A_5$ | $F_5$ | |
| 6 | Convex arc | $A_6$ | $F_6$ | $R_6$ |
| 7 | Convex arc | $A_7$ | $F_7$ | $R_7$ |
| 8 | Concave arc | $A_8$ | $F_8$ | $R_8$ |
| 9 | Straight line | $A_9$ | $F_9$ | |

On the basis of the above input, the CPU 18 computes the machining shape, start point, end point, center point, radius and others (including RPM and feed) for each machining step, the results being then stored in the finishing buffer. On the basis of such data, the CPU then decides whether it is necessary to compensate the nose of the cutting tool and whether the machining paths for adjoining machining steps are continuous or not, the resulting data being stored as the path of movement of the finishing tool in the finish machining, so that continuous machining control is achieved.

When the preparation of the machining data for all the machining steps for said input buffer is completed, the next procedure is to prepare data for rough finish machining.

In this case, the path of movement of the rough finish machining tool is such that it is spaced from the path of movement of the finish machining tool by an amount corresponding to the finishing allowance. Accordingly, it may be considered to have a shape obtained by connecting an infinite number of rectangles defined by the X and Z components $\delta_x$, $\delta_z$ of the finishing allowance along the finish line. (See FIG. 6)

Since the machining shape in each machining step may be considered to be the same as the finish machining shape, the way of finding the rough finish machining size in each machining step will be described below.

Since the way of finding the rough machining point is the same for each machining step, in a given machining step (for example, the Nth machining step), if the finish start point is represented by $A_N$, the end point by $F_N$, and the center point by $P_N$ and if the corresponding rough finish start point is represented by $A_N'$, the end point by $F_N'$ and the center point by $P_N'$, then the rough finishing point can be represented by the finish point plus the finishing allowance $\delta$. Thus, the X and Z components are as follows.

$$X(A_N')=X(A_N)+\delta_x$$

$$X(F_N')=X(F_N)+\delta_x$$

$$X(P_N')=X(P_N)+\delta_x$$

$$Z(A_N')=Z(A_N)\pm\delta_z$$

$$Z(F_N')=Z(F_N)\pm\delta_z$$

$$Z(P_N')=Z(P_N)\pm\delta_z$$

where the plus or minus sign of $\delta_z$ is determined such that it is plus when $X(A_N) \leq X(F_N)$, and it is minus when $X(A_N) > X(F_N)$.

Where computations are made according to the above rule, in the case of a shape shown in FIG. 7 in which the start point $X(A_N)$ for the Nth machining step is smaller than or equal to the end point $X(F_N)$ and in which the start point $X(A_{N-1})$ for the preceding machining step is larger than the end point $X(F_{N-1})$, the point of contact between these two machining steps shifts. That is, the rough finish end point $(F_N')$ is expressed by $$X(F_N')=X(F_N)+\delta_x$$

$$Z(F_N')=Z(F_N)+\delta_z$$

but the rough finish start point $(A_{N-1}')$ for the (N−1)th machining step is expressed by $$X(A_{N-1}')=X(A_{N-1})+\delta_x$$

$$Z(A_{N-1}')=Z(A_{N-1})-\delta_z$$

Thus, the points $(F_N')$ and $(A_{N-1}')$ have the same X coordinate value, but their Z coordinate values are $2\delta_z$ apart from each other. ($\because A_{N-1}=F_N$)

Thus, in this case, that is, when $$\begin{cases} X(A_N) \leq X(F_N) \\ X(A_{n-1}) > X(F_{n-1}) \end{cases}$$

the discrepancy in the point of contact between the two machining steps can be eliminated and continuous control is made possible by interpolation with a line connecting $(F_N')$ and $(A_{N-1}')$.

Further, such discrepancy in the point of contact occurs in the case of FIG. 8. Thus, when $$\begin{cases} X(A_N) > X(F_N) \\ X(A_{N-1}) \leq X(F_{N-1}), \end{cases}$$

$$\begin{cases} X(F_N') = X(F_N) + \delta_x \\ Z(F_N') = Z(F_N) - \delta_z \\ X(A_{N-1}') = X(A_{N-1}) + \delta_x \\ Z(A_{N-1}') = Z(A_{N-1}) + \delta_z. \end{cases}$$

In this case, the points $(F_N')$ and $(A_{N-1}')$ overlap by an amount corresponding to $2\delta_z$. ($\because A_{N-1}=F_N$)

Then, the intersection between the straight line (or arc) $(A_N') \rightarrow (F_N')$ and the arc (or straight line) $(A_{N-1}') \rightarrow (F_{N-1}')$ is computed and arc compensation with said intersection used as the point of contact.

The said intersection can be easily computed from an equation for the rough finishing line for the Nth machining step and an equation for the rough finishing line for the (N−1)th machining step.

In cases other than the two (FIGS. 7 and 8) described above, there is no such discrepancy in the point of contact, so that there is no need for compensation.

Figure 9:
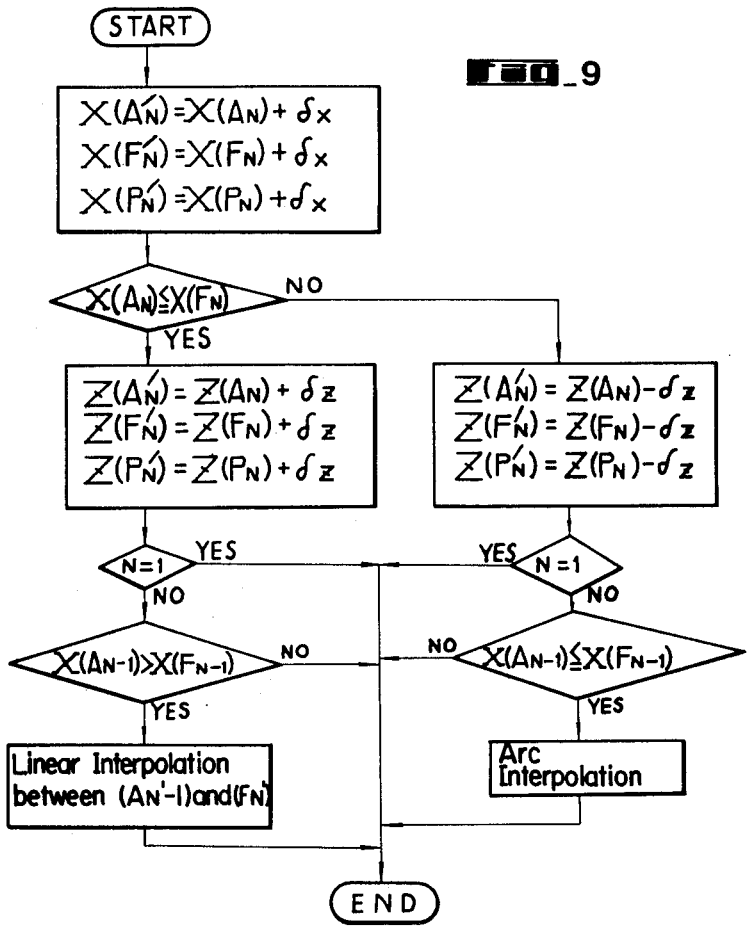
FIG. 9 is a flow chart showing how to prepare a rough finish buffer in any desired machining step in copy-machining.

In brief, a flow chart for computations of the individual points for the Nth rough finish machining is as shown in FIG. 9, and the same is executed successively for all the machining steps, and the results are stored in the rough finishing buffer. In addition, in the flow chart shown in FIG. 9, the fact that decision about N=1 indicates that when N=1, the preceding machining step (N−1) is absent and that the results of the computations at the preceding stage are stored in the rough finishing buffer.

Such values stored in the rough finishing buffer indicate main points on the rough finishing line in the rough finish machining, and at the time of actual rough finish machining, linear interpolation or arc interpolation is made between adjacent points according to the shape (straight or arcuate) to provide continuous contour machining data.

Preparation of the rough machining buffer will now be described.

In this case, the term "rough machining" refers to machining a blank shape until the rough finishing line is reached, and the amount to be cut off is generally called an allowance.

Figure 10:
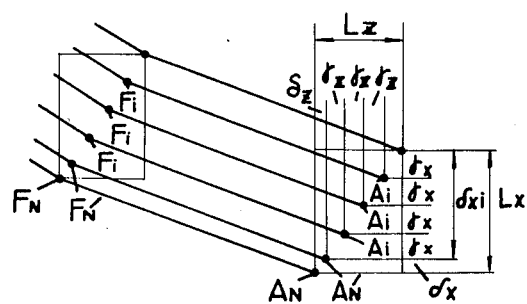
FIG. 10 is a diagram showing how to find a rough finish line in copy-machining.

In this invention, an allowance is defined as a shape obtained by connecting an infinite number of rectangles defined by $L_x$, $L_z$ on the finishing line, as shown in FIG. 10, as a whole including the allowance between the finishing line and the rough finishing line.

The amount of cut and the machining allowance $\gamma_z$ and $\delta_z$ are found from the relation $L_x/L_z=\delta_x/\delta_z=\gamma_x/\gamma_z$ on the basis of the initially inputted allowances $L_x$, $L_z$, amount of cut $\gamma_x$ and finishing allowance $\delta_x$.

The dimension $L_x$ of said allowance in the X-axis direction may be set with the thickness of the blank portion of maximum allowance used as a standard. Even if there is some variation in the actual allowance between portions of individual blanks or of the same blank with respect to said set value, there will be no trouble because of the operation being rough machining. Particularly because the allowance is set on the basis of the finishing line which is the final machining shape, there is no influence on the machining accuracy of the workpiece.

Since rough machining is performed by cutting the blank progressively from the outer side to the rough finishing line with the amount of cut, the number of repetitions of rough machining is such that if dividing the allowance by the amount of cut gives a quotient (integer) and a remainder, said remainder is added to the amount of cut for rough finish machining time.

First, the way of finding the tool path for rough machining in each time will be described.

This may be considered in the same manner as in the case of finding the rough finishing line from the finishing line as described above. Thus, take the finishing point $A_N$ in the flow chart of FIG. 9 as the rough finishing point $A_N'$ and the finishing allowances $\delta_x$, $\delta_z$ as the rough finishing allowances $\delta_{xi}$, $\delta_{zi}$. However, the rough finishing allowances $\delta_{xi}$, $\delta_{zi}$ will be reduced by an amount corresponding to the amount of cut for each rough machining.

Figure 11:
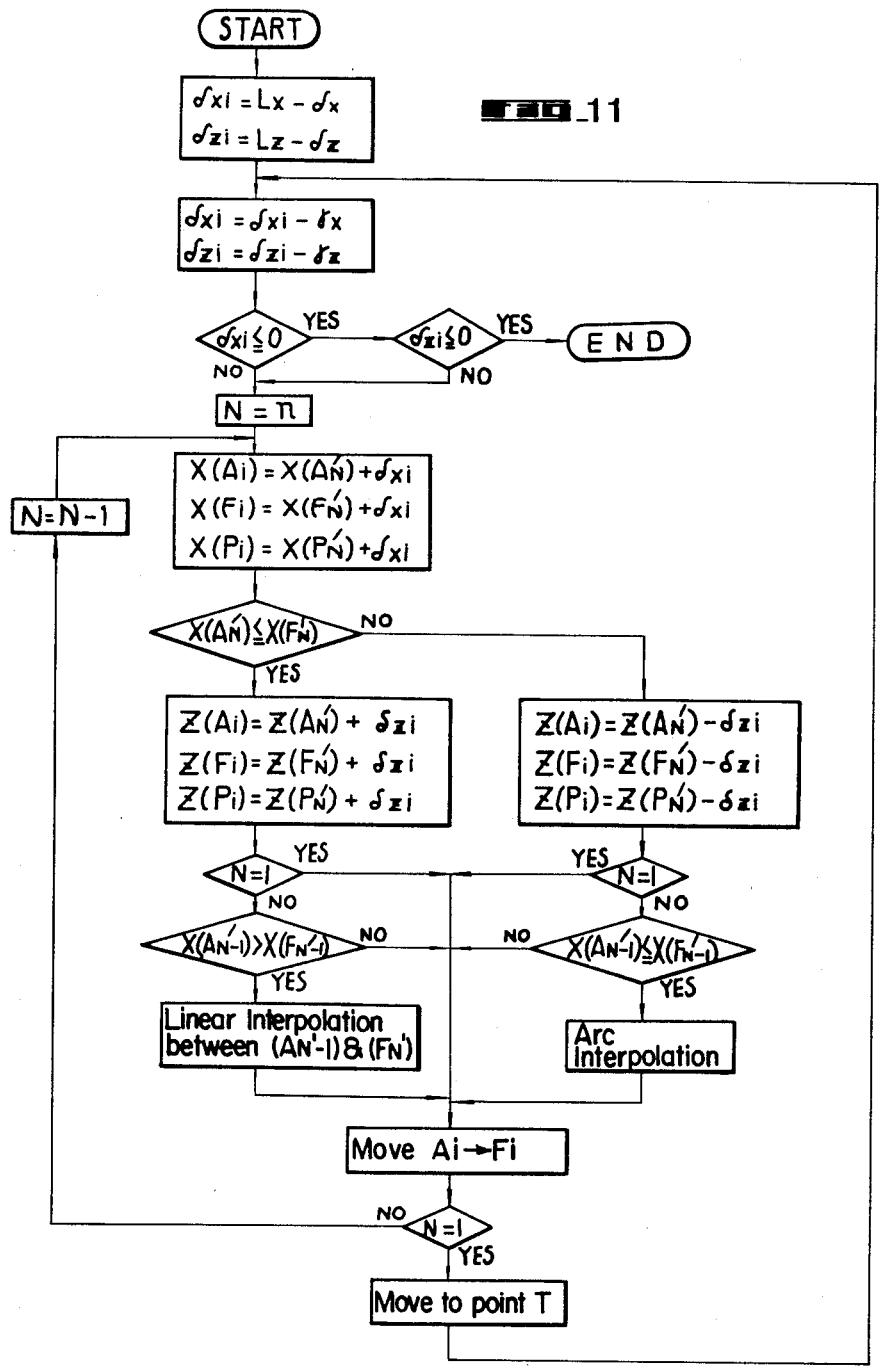
FIG. 11 is a flow chart showing how to prepare a rough machining buffer in copy-machining.

To describe it concretely with reference to the flow chart of FIG. 11, the tool path for the first rough machining is computed in response to a machining start instruction.

For this purpose, the finishing allowances $\delta_x$, $\delta_z$ are subtracted from the inputted allowances $L_x$, $L_z$, and then the amounts of cut $\gamma_x$, $\gamma_z$ are subtracted from the result.

The next step is to decide whether the values $\delta_{xi}$, $\delta_{zi}$ are each equal to or less than 0. If both answers are yes, the machining is ended and if both are no, then with the machining step number N used as the final nth machining step, the start points $X(A_i)$, $Z(A_i)$, the final points $X(F_i)$, $Z(F_i)$ and the center points $X(P_i)$, $Z(P_i)$ for rough machining are found from said nth machining step.

When the roughing start point $(A_i)$ and the roughing end point $(F_i)$ for the nth machining step are found, the roughing tool is moved from $(A_i)$ to $(F_i)$. If the machining step N is 1, it is moved to the point of cut (T) and if the machining step N is not 1, the machining step is advanced to the next machining step, namely, $N=N-1$ and the roughing start point $(A_i)$, the roughing end point $(F_i)$ and the center point $(P_i)$ for that machining step are found, such operation being repeated until $N=1$.

That is, in rough machining, the rough machining buffer has a memory capacity for only one machining step, so that the tool is moved each time and the memory is rewritten so as to continue the machining operation.

As soon as the first rough machining is completed in this way, the second rough machining is started. At this time, the rough finishing allowances $\delta_{xi}$, $\delta_{zi}$ are provided by subtracting the amounts of cut $\gamma_x$, $\gamma_z$.

Until the rough finishing allowances $\delta_{xi}$, $\delta_{zi}$ are such that $\delta_{xi} \leq 0$ and $\delta_{zi} \leq 0$, the rough machining is repeated to completion.

Concretely, in FIG. 5, the path of movement of the tool for the uppermost line is machined starting at the right-hand end of the step while finding start points, end points and center points until the tool reaches the left-hand end, whereupon the tool is returned to the cut point T and subsequently the second rough machining is performed in the same manner. Finally, the amount corresponding to the remainder resulting from division by the amounts of cut $\gamma_x$, $\gamma_z$ is cut by rough finish machining until the rough finishing line is reached, and the amount corresponding to the finishing allowance is cut by finish machining, so as to complete the machining.

With the method described above, copy-machining a complex shape with concaves and convexes on an NC machine tool can be performed by simply inputting the finish machining size, since the computer then automatically computes the rough finishing size and the roughing size. This reduces the number of times of manual inputting by the operator and also reduces useless movement of the tool, thus providing for high efficiency machining.

The way of preparing the machining buffer assembly 21 will now be described by way of example with reference to rough machining of a cylindrical workpiece on a lathe.

As described above, according to the present invention, a workpiece can be automatically machined into a complicated shape as shown in FIG. 12 in the order of rough machining, rough finish machining and finish machining by simply inputting common data comprising original position (for indexing a tool), finishing allowance $\delta$, and angle of cut $\alpha$, end-cutting-edge angle $\beta$ and nose radius r which are associated with a predetermined tool number, and such machining step data as machining shape, X and Z coordinates of a point of cut, X and Z coordinates of a start point, X and Z coordinates of an end point, radius R with which to cut a corner, amount of cut $\gamma$, finishing tool number m, rough machining tool number m', RPM N, and feed speed V. The machining buffer assembly 21 has a finishing buffer, a rough finishing buffer and a rough machining buffer for storing data on finish machining size, rough finish machining size, and rough machining size.

The rough machining buffer is so arranged that it is capable of storing data on machining shape, start point A, end point F, center point P, radius R, amount of cut $\gamma$, rough machining start point M, and others (including RPM and feed speed), for each machining step, as shown below.

| | Rough finishing buffer | | |
| | Machining step | | |
| | 1st | 2nd | nth |
| --- | --- | --- | --- |
| Machining shape | On-the-way concave, convex circle | | |
| Start point X(A), Z(A) | (100, 200) | | |
| End point X(F), Z(F) | (150, 250) | | |
| Center point X(P), Z(P) | (100, 250) | | |
| Radius R | 50 | | |
| Amount of cut $\gamma$ | 5 | | |
| Rough machining start point M | | | |
| Others | | | |

The finishing buffer is arranged in the same manner as said rough finishing buffer.

The coordinates of said start point, etc. are expressed by the use of the rectangular coordinate system with the origin at one end of a blank, the axis of rotation of the blank taken as the Z axis and the X axis extending at right angles to said Z axis. The values of the start points, end points and center points for said finishing buffer and rough finishing buffer, respectively, are computed and stored on the basis of the finish machining size inputted into the microcomputer 17.

The machining step numbers described above are illustrated in FIG. 12. Thus, the first machining step extends between 1 and 2, the second machining step extends between 2 and 3, and so on, the final machining step extending between 9 and 10. In FIG. 12, the operation is divided into 9 machining steps and the start point for each machining step are computed, and in the case of the machining shape and arc of each portion of the blank, the center point is computed and stored in said buffer.

The rough machining buffer stores the one-unit-earlier roughing start point Gi−1, the roughing start point Gi, the roughing end point Hi, and the roughing return point Ji, as shown below. Thus, use is made of such a buffer as has a memory capacity enough to store data just for one machining step, i.e., said four points, irrespective of the number of machining steps.

| Rough machining buffer |
| --- |
| One-unit-earlier roughing start point X(Gi − 1) |
| Roughing start point X(Gi), Z(Gi) |
| Roughing end point X(Hi), Z(Hi) |
| Roughing return point X(Ji), Z(Ji) |

The way of rough machining is classified according to two machining shape patterns, namely, the open type as shown in FIG. 13 and the on-the-way concave type as shown in FIG. 14.

Further, the tool moving instruction pattern in rough machining is fixed, as shown in FIG. 15, such that in the path from Gi−1 to Gi, quick feed is employed for the open type and cutting feed for the on-the-way concave type; in the path from Gi to Hi, cutting feed is employed for both types; and in the path from Hi and Ji, quick return is employed for both types.

If the Z and X coordinates of said Gi, Hi and Ji are successively computed, rough machining can be carried out.

The computation method will now be described.
The following relations may be obtained.
$X(Gi) = X(Gi−1) − \gamma$ ($\gamma$ is the amount of cut.)
$X(Hi) = X(Gi)$
$X(Ji) = X(Gi) + a$ (a is a fixed value, given as 0.1–0.5 mm.)
$Z(Ji) = Z(Gi)$.

Therefore, the only problem is Z(Gi) and Z(Hi), which can be found depending upon machining shape, as follows.

| machining shape | Z(Gi) |
| --- | --- |
| Open type | $Z(Gi) = Z(A_n) + b$ (b = 0.1–5 mm) |
| On-the-way concave taper | $Z(Gi) = Z(A) - \frac{Z(A) - Z(F)}{X(A) - X(F)} \{X(A) - X(Gi)\} - \delta$ |

| On-the-way convex circle | $Z(Gi) = Z(P) - \sqrt{R^2 - \{X(P) - X(Gi)\}^2} - \delta$ |
| --- | --- |
| On-the-way concave circle | $Z(Gi) = Z(P) + \sqrt{R^2 - \{X(P) - X(Gi)\}^2} - \delta$ |

Where An is the start point of the final machining step (right-hand end.)

| Machining shape | Z(Hi) |
| --- | --- |
| Taper | $Z(Hi) = Z(A) - \frac{Z(A) - Z(F)}{X(A) - X(F)} \{X(A) - X(Gi)\} + \delta$ |

| -continued | |
| --- | --- |
| Convex circle | $Z(Hi) = Z(P) + \sqrt{R^2 - \{X(P) - X(Gi)\}^2} + \delta$ |
| Concave circle | $Z(Hi) = Z(P) - \sqrt{R^2 - \{X(P) - X(Gi)\}^2} + \delta$ |

Figure 16:
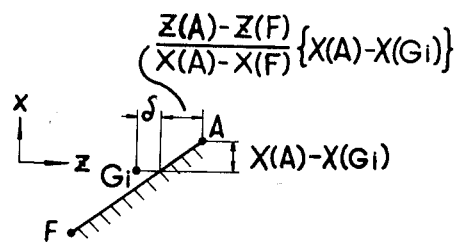
FIG. 16 is a diagram showing how to find a rough machining start point of a cylindrical workpiece in the case of an on-the-way concave type having a taper.

Thus, Z(Gi) in the on-the-way concave taper can be found from the Z and X coordinates of the taper start point (A) and end point (F) for the rough finishing size shown in FIG. 16, with consideration given to a finishing allowance $\delta$. The purpose of consideration of such finishing allowance $\delta$ is to prevent the tool from cutting into the rough finish machining tool path during rough machining, so as to smooth the finish provided by rough finish machining, but it is not absolutely necessary.

Figure 17:
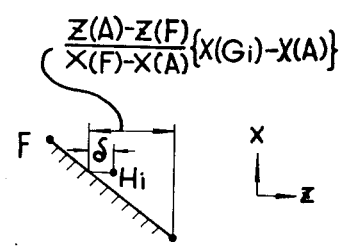
FIG. 17 is a diagram showing how to find a rough machining end point of a cylindrical workpiece in the case of a taper.

Further, Z(Hi) in the on-the-way concave taper can be computed in the same manner as in the above paragraph, as shown in FIG. 17.

Figure 18:
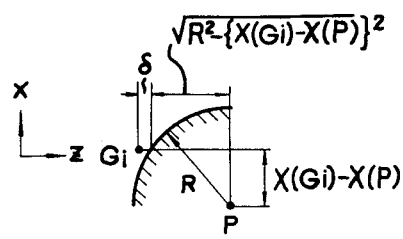
FIG. 18 is a diagram showing how to find a rough machining start point of a cylindrical workpiece in the case of an on-the-way concave type with a convex circle.

Further, as for Z(Gi) in the convex circle, the Z and X coordinates Z(P) and X(P) of the center point can be computed from the arc start point and end point and the radius R, from which it is computed as shown in FIG. 18.

Figure 19:
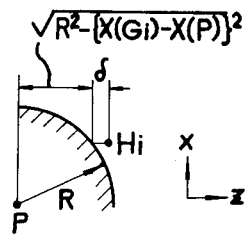
FIG. 19 is a diagram showing how to find a rough machining end point of a cylindrical workpiece in the case of a convex type.

Similarly, Z(Hi) for the concave circle is computed as shown in FIG. 19.

Figure 20:
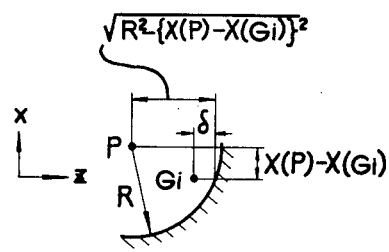
FIG. 20 is a diagram showing how to find a rough machining start point of a cylindrical workpiece in the case of an on-the-way concave type with a concave circle.
Figure 21:
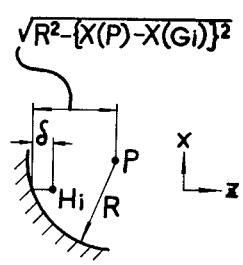
FIG. 21 is a diagram showing how to find a rough machining end point of a cylindrical workpiece in the case of a concave type.

Further, Z(Gi) for the convex circle is computed as shown in FIG. 20, and Z(Hi) is computed as shown in FIG. 21.

Therefore, given the machining shape, start point A, end point F, arc center point P, arc radius R, amount of cut $\gamma$, finishing allowance $\delta$ and X coordinate X(Gi-1) of the one-unit-earlier roughing start point, it is possible to compute Z(Gi) and Z(Hi).

As for said A, F, P, R, $\gamma$ and $\delta$, it is sufficient to give the machining step number N for the rough finishing buffer. Thus, after all, it is sufficient to give the machining step number N for the rough finishing buffer and X(Gi−1).

The machining step number N for either Z(Gi) or Z(Hi) may be sequentially given, the machining step number for the other being selected.

Figure 22:
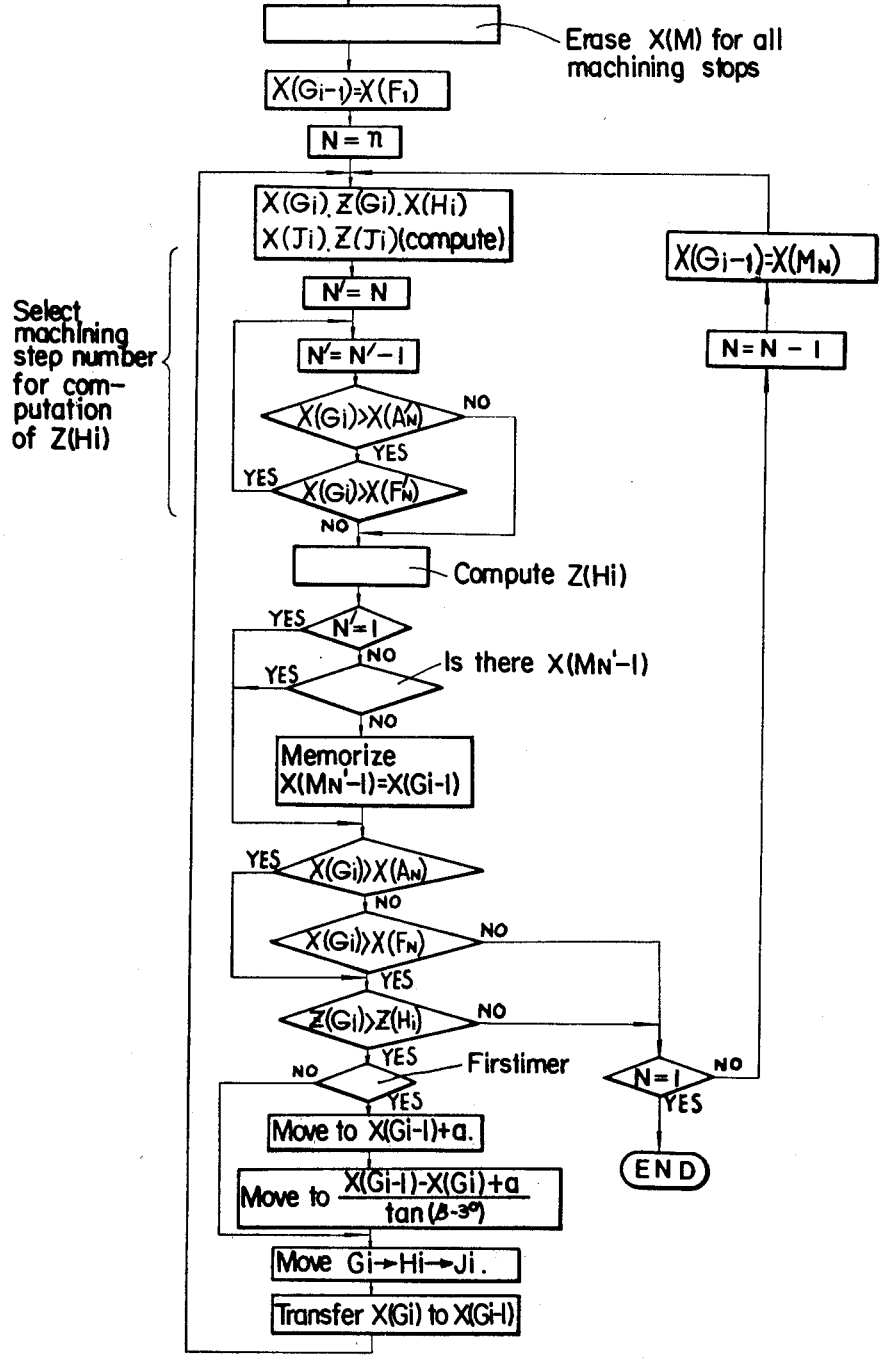
FIG. 22 is a flow chart showing a rough machining control method for a cylindrical workpiece in the case of an on-the-way concave type.

A flow chart for the same is shown in FIG. 22.

The rough machining start point X(M) for all the machining steps for the rough finishing buffer in FIG. 22 may be erased in advance. As for the one-unit-earlier roughing start point (Gi−1) in the first time, it is sufficient to give the end point (F1) of the first machining step for the rough finishing buffer. Therefore, X(Gi−1)=X(F1).

As for the machining step number N, since rough machining is started at the final machining step, N=n.

From the above, the values X(Gi), Z(Gi), X(Hi), X(Ji) and Z(Hi) are computed.

Next, the one-unit-earlier machining step number N'=n−1 is given, and Z(Hi) is computed.

In this case, if both of the X coordinate X(A$_{N'}$) of the start point and the X coordinate X(F$_{N'}$) of the end point for the N'th machining step are less than X(Gi), the one-unit-earlier machining step number is provided and such a machining step number as will make either X(A) or X(F) greater than X(Gi) is selected for computation of Z(Hi).

If the machining step number N'−1 which is one unit earlier than this machining step number has no rough machining start point X(M$_{N'-1}$), then X(M$_{N'-1}$)=X(Gi−1) will be stored in the rough finishing buffer.(X(M) for all machining steps is erased in advance.)

Next, decision as to the completion of rough machining is made, and if it has been completed, the machining proceeds to the next step number N−1 and X(MN) stored is given as X(G−1).

Figure 23:
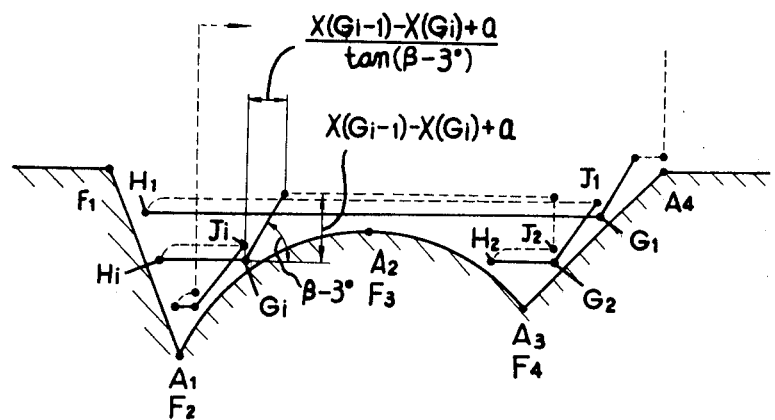
FIGS. 23 and 24 are diagrams showing applications of a cutting path for a rough machining tool obtained by the rough machining control method for a cylindrical workpiece according to the flow chart shown in FIG. 22.
Figure 24:
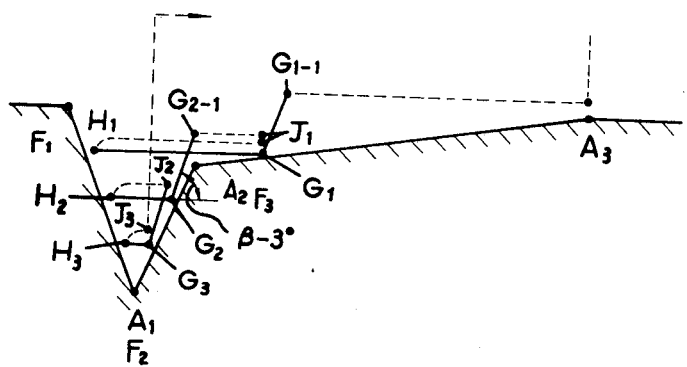

If it is not completed, an instruction is issued to move the tool Gi→Hi→Ji as found, but in consideration of the cases shown in FIGS. 23 and 24 it is necessary that after it is moved to X(Gi−1)+a in the X axis direction, it be moved to $$Z(Gi) + \frac{X(Gi-1) - X(Gi) + a}{\tan(\beta - 3°)}$$

in the Z axis direction, in the first time.

That is, in the case of FIG. 23, the number of machining steps for the rough finishing buffer is 4; the first machining step with the start point at A1 and the end point at F1, the second machining step with the start point at A2 and the end point at F2, the third machining step with the start point at A3 and the end point at F3, and the fourth machining step with the start point at A4 and the end point at F4. The rough machining is started at the final or fourth machining step. In this case, G1, H1 and J1 are computed by the method shown in FIGS. 16 and 17, G2 is found from G1 by the method shown in FIG. 16, H2 is found by the method shown in FIG. 19, and so on. In the case of FIG. 23, the roughing start point, end point and return point for the third machining step are indicated with the suffix "i", thus giving Gi, Hi and Ji, and can be computed by the method already described. However, the roughing start point X(Gi−1) in the machining step which is one unit earlier than Gi was the rough machining start point X(M$_{N-1}$). Thus, stated concretely, X(Gi) in FIG. 23 corresponds to X(Gi−1).

Stated concretely, in FIG. 23, there is issued an instruction to move the tool to X(Gi−1)+a, i.e., X(G1)+a in the X axis direction and then to $$Z(Gi) + \frac{X(Gi-1) - X(Gi) + a}{\tan(\beta - 3°)}$$

in the Z axis direction.

The value β, as shown in FIG. 3, is the end-cutting-edge angle of the tool and has been inputted into the control device in advance.

In computing the roughing start point Gi, roughing end point Hi and roughing return point Ji for rough machining from the values of start points and end points for individual machining steps stored in the rough finishing buffer, said instruction is issued only when said Gi, Hi and Ji in the first time in each machining step for the rough finishing buffer must be computed.

In the case shown in FIG. 24, the rough finishing buffer stores A1 and F1 as the start and end points, respectively, for the first machining step, A2 and F2 as the start and end points, respectively, for the second machining step, and A3 and F3 as the start and end points, respectively, for the third machining step. Thus, in this case, the number of machining steps is 3. In this case, the first X(Gi−1) in the third machining step is given as X(Gi−1)=X(Fi) in the flow chart of FIG. 22 and the point G1 with n=3 can be found by the method shown in FIG. 16. H1 is found in FIG. 17, and (Ji) is found such that J(1) =X(G1)+a and Z(J1)=Z(G1). G2 is found from the start point A2 and end point F2 of the second machining step by the method shown in FIG. 16, and H2 is found by the method shown in FIG. 17. In this case, as for movement of the tool to the point X(Gi−1), namely, X(G−2), it is moved from the point J1 to X(Gi−1)+a in the X axis direction. Actually, however, X(Gi−1) is X(Gi) and X(G1)+a corresponds to X(Ji). Thus, as for movement from J1 to the point X(G$_{2-1}$), movement in the X axis direction is not effected (because there is no need) and the tool is moved only in the Z axis direction to $$Z(G2) + \frac{X(G1) - X(G2) + a}{\tan(\beta - 3°)},$$

namely, Z(G$_{2-1}$). In the case of point G3, since this is the second time of the second machining step (and hence there is no need for said movement), the tool is moved directly from point J2 to point G3.

When rough machining is completed in the described manner Gi→Hi→Ji, X(Gi) is transferred to X(Gi−1) of the rough machining buffer and the memory of Gi, Hi and Ji of the rough machining buffer is erased.

Said X(Gi−1) is given and rough machining is performed while the next Gi, Hi and Ji are computed.

Since the contents of the rough machining buffer are progressively updated in the manner described above, it is possible for a very small memory capacity to accommodate an infinite number of times of rough machining.

In addition, in the case of the open type, since Z(Gi)=Z(An)+b (where b is 0.1-5 mm, and An is the start point of the last machining step), it is only necessary to compute Z(Hi).

The machining step number in this case may be given sequentially from the first machining step.

Figure 25:
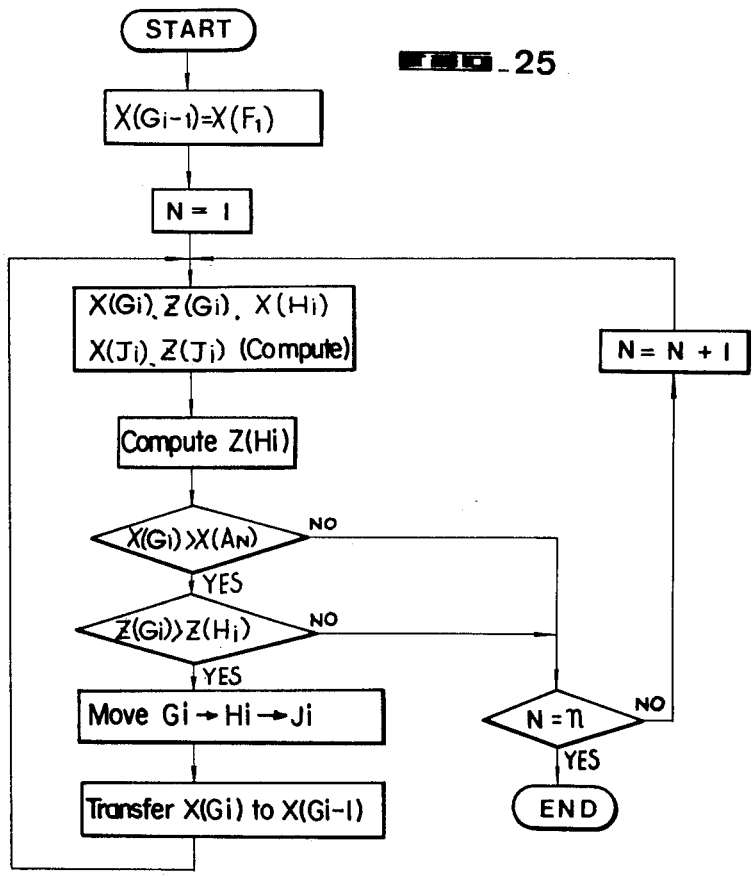
FIG. 25 is a flow chart showing a rough machining control method for a cylindrical workpiece in the case of an open type.

A flow chart for computation in this case is very simple, as shown in FIG. 25, as compared with the on-the-way concave type described above.

Combination of the two types, or on-the-way concave type and open type, of rough machining methods makes possible the machining of complicated shapes.

Figure 26:
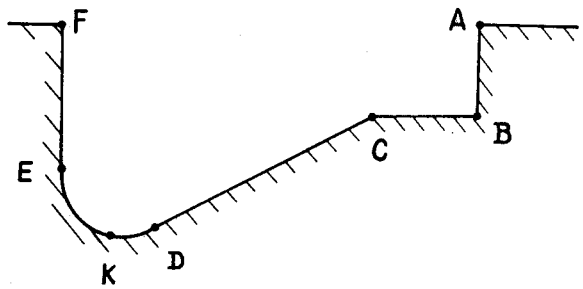
FIG. 26 is a diagram showing a machining shape, showing a case where, in an on-the-way concave type, rough machining control of a cylindrical workpiece can be performed in one step according to the invention.

In addition, according to the present invention, a machining shape given by A, B, C, D, K, E, F, as shown in FIG. 26 can be rough machined in one step. That is, if it is so arranged that X(M′) can be stored for use inside the machining step separately from X(M), computations inside the machining step can be made by using a flow chart in which X(M) in FIG. 22 is replaced by X(M′).

With the above arrangement, it is possible to machine complicated shapes having concaves and convexes by a simple inputting operation, so that the function of NC lathes of this type can be greately increased.

A method of finding a machining shape which can be actually machined by the lathe using a predesignated tool will now be described in detail.

Figure 27:
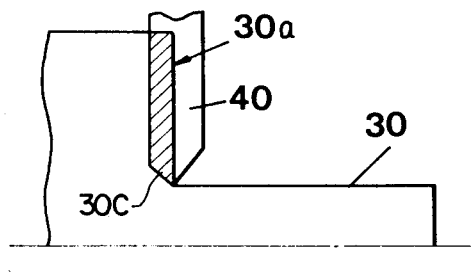
FIGS. 27 and 28 are diagrams showing cases where a tool and a machining shape interfere with each other, thus making machining impossible.

For example, when the vertical wall portion 30a of a workpiece 30 shown in FIG. 27 is to be cut by a cutting tool 40 whose cutting angle α is 90° or less, if the tool 40 moves from right to left according to the finish size of the workpiece 30, troubles would be caused by the tool 40 eating into the vertical portion 30a.

Figure 28:
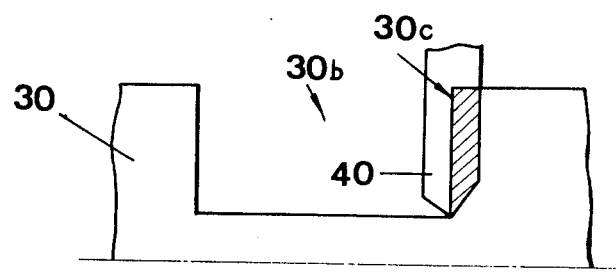

Further, in the case of a workpiece 30 having a concave 30b on the way, as shown in FIG. 28, in cutting the vertical wall portion 30c on the start end side, troubles would be caused if it is cut by a cutting tool 40 whose end-cutting-edge angle β is 90° or less.

Figure 29:
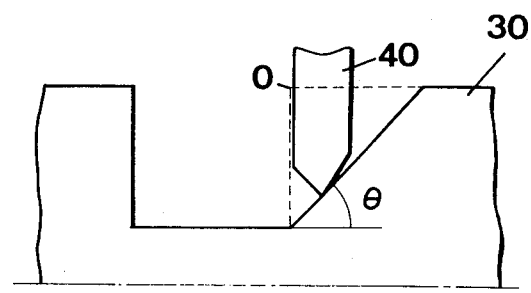
FIG. 29 are diagrams showing a conventional interpolation method used in such cases.

In order to eliminate these troubles, one method would be for the operator to compensate values, to be inputted, about the finish size of the workpiece in consideration of the shape of the cutting tool to be used and input the same, and another method would be to cut toward the input point (O) at a fixed angle of $\theta$ without regard to the tool shape and the finish shape of the workpiece, as shown in FIG. 29. However, there is a variety of cutting tool shapes, so that the former method of compensating values to be inputted would involve a very complicated inputting operation and tend to cause errors, while the latter method of cutting with a fixed pattern would be limited in the finish shape of the workpiece.

The present invention comprises classifying various tools used on lathes according to shape into code numbers, fixedly storing the latter in the memory section of the NC lathe, inputting data on tools to be used into a machining data preparing section with said code numbers and retrieving stored data on a particular tool.

Classification of tools according to shape is based on the cutting angle $\alpha$ and end-cutting-edge angle $\beta$ of each tool, as shown in FIG. 3, and these values are classified into code numbers, as shown in the table below.

TABLE

| Code | α | β |
|---|---|---|
| 0 | 93° | 30° |
| 1 | 93° | 5° |
| 2 | 45° | 45° |
| 3 | 60° | 60° |
| 4 | 75° | 15° |
| 5 | 93° | 37° |
| 6 | 93° | 52° |
| 7 | 93° | 93° |

It is desirable that the number of digits used in code numbers be small. The inputting method is by the use of function keys on the key board.

According to the invention, as described above, machining shape patterns and amounts of cut are inputted, in digital representation and as indicated by the finish size written on the engineering drawing, into the machining data preparing section by function keys on the key board.

The machining data preparing section automatically computes the optimum tool path for the tool from the inputted tool code number, machining shape pattern and amount of cut, so as to prepare machining data.

The machining shape patterns are classified into a straight line, taper, convex circle, concave circle, on-the-way concave, etc., and function keys corresponding thereto are provided on the key board so that the operator manipulates them to input said pattern. In addition, each key is marked with the corresponding word or words.

These patterns are basic to any machining shape, and can be applied to any complicated shape.

As for the amount of cut, the axial dimension of the workpiece and radius, with the end surface of the workpiece used as the reference, are inputted in digital representation.

Concretely, the Z axis is taken on the axis of the workpiece and the X axis on the end surface of the workpiece and the start and end points of the machining position are measured from the end surface of the workpiece, the measured values being the X axis coordinates thereof, and the finish radius values at the start and end points of the machining position are the X axis coordinates.

Figure 30:
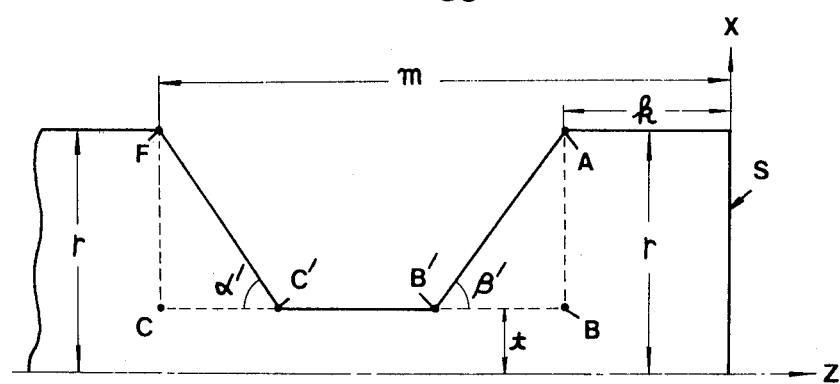

For example, as shown in FIG. 30, when it is desired to machine an on-the-way concave type, the key for on-the-way concave is used to input the machining shape pattern, the axial dimension k from the end surface S to the machining start point A and the radius r at point A are inputted as the amount of cut, the axial dimension m from the end surface S of the workpiece to the machining end point F and the radius r at point F are inputted, and the radius t in a recess between A and F is inputted, As a result, the machining data preparing section stores the machining shape as follows.

X coordinate of point A is $X_r$, and its Z coordinate is $-Z_k$

X coordinate of point B is $X_t$, and its Z coordinate is $-Z_k$

X coordinate of point C is $X_t$, and its Z coordinate is $-Z_m$

X coordinate of point F is $X_r$, and its Z coordinate is $-Z_m$.

Thus, the machining data preparing section computes the optimum tool path for the tool from said machining shape and said tool code number.

In this computation, $\pi - \angle ABC$ is compared with the end-cutting-edge angle $\beta$ of the tool and $\pi - \angle BCF$ is compared with the cutting angle $\alpha$ of the tool. If $\pi - \angle ABC$ and $\pi - \angle BCF$ are smaller than $\beta$ and $\alpha$, respectively, it is decided that there is no need for compensation, and with the machining data as A→B→C→F, the tool path data is prepared.

Bus, if $\pi - \angle ABC$ and $\pi - \angle BCF$ are equal to $r_o$ greater than $\beta$ and $\alpha$, respectively, points B and C are compensated as follows.

$$\angle AB'B = \beta - 3° = \beta'$$

$$\angle BC'F = \alpha - 3° = \alpha'$$

The angle of 3° provides room for avoiding interference with the tool, and such angle may be the irreducible minimum, not being limited to 3°.

The X coordinate of said point B' is the same and only its Z coordinate is compensated so that it is $-k-(r-t)\cot\beta'$.

Further, the X coordinate of point C' is the same and only its Z coordinate is compensated so that it is $-m+(r-t)\cot\alpha'$.

Therefore, when $\pi - \angle ABC < \beta$, it is not compensated, when $\pi - \angle ABC \geq \beta$, it is compensated, when $\pi - \angle BCF < \alpha$, it is not compensated, when $\pi - \angle BCF \geq \alpha$, it is compensated. When it is compensated, the tool path is A→B'→C'→F.

Figure 31:
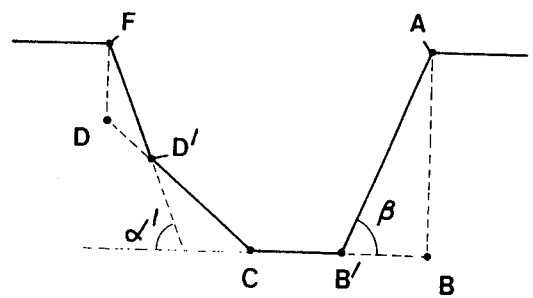
Figure 32:
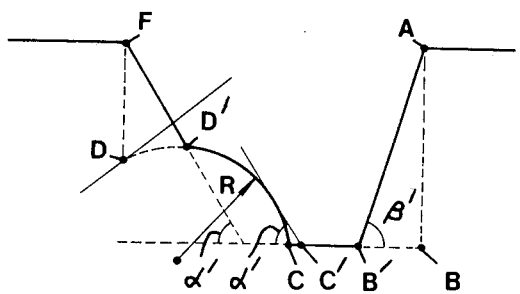

Further, the same procedure is taken when, as shown in FIG. 31, there is a taper in the interior of an on-the-way concave and when, as shown in FIG. 32, there is a convex circle in the interior of an on-the-way concave.

That is, in FIG. 31, the machining shape pattern is inputted by the keys for on-the-way concave and taper, and the amount of cut is inputted by inputting $A(X_A, Z_A)$, $B(X_B, Z_B)$, $C(X_C, Z_C)$, $D(X_D, Z_D)$, and $F(X_F, Z_F)$.

In so doing, the comparison previously described is made as to B, C and D. In the case of FIG. 31, points B and D are compared and since the angle at point C is smaller than $\alpha$, no compensation is made.

That is, point B is compensated for its Z coordinate to move to point B'.

The Z coordinate of said point B' is computed as $Z_B - (X_A - X_B) \cot \beta'$.

Further, point D is compensated to move to point D', and its X coordinate is $$\frac{X_D(Z_F - Z_C)\tan \alpha' + X_F(X_D - X_C)}{X_D - X_C + (Z_D - Z_C)\tan \alpha'}$$

its Z coordinate is $$\frac{Z_C(X_D - X_F) + Z_F(X_F - X_C) + (Z_F - Z_C)Z_F \tan \alpha'}{X_D - X_C + (Z_F - Z_C)\tan \alpha'}$$

Further, in FIG. 32, the machining pattern is inputted by the keys for on-the-way concave and convex circle, and the amount of cut is inputted by inputting $A(X_A, Z_A)$, $B(X_B, Z_B)$, $C(X_C, Z_C)$, $D(X_D, Z_D)$, $F(X_F, Z_F)$ and the radius R of the arc.

In this case, point B is similarly compensated to move to point B', and points C and D are compensated as follows.

First, the angle of the tangent to the circle at point C is compared with the cutting angle $\alpha$ of the tool, as described above, and if it is equal to or greater than $\alpha$, the point is compensated to move to point C'.

That is, as for point C', a tangent to the arc at an angle $\alpha'$ is found, and the intersection between this tangent and the line segment BC is found, so that the coordinates of C' are automatically computed.

As for point D, the intersection D' between a straight line with an angle $\alpha$ passing through point F and the arc is found as a compensation point and its coordinates are computed.

Therefore, in FIG. 32, the tool path A→B'→C'→D'→F is given as the machining data.

Further, in the case of a concave circle, comparison and compensation can be similarly made.

As described above, machining shapes can be automatically corrected with respect to tools having various cutting angles and machined.

Further, the present invention has the function of deciding whether a cutting edge shape designated by the input code of a tool is capable of cutting an inputted machining shape, and, where such cutting is impossible, reporting it to the operator through the control device of the machining preparing section.

This will now be described in more detail.

For example, as shown in FIG. 33, when it is intended to cut a shape having taper angles of $\lambda$ and $\sigma$ under the conditions $\alpha < \lambda$ and $\beta < \sigma$, it is reported that the selection of the tool is incorrect.

In the machining of a convex circle as shown in FIG. 34, a similar report is made if the angle of the tangent to the initial end is greater than $\alpha$ and if the angle of the tangent to the terminal end is greater than $\beta$.

In the machining of a concave circle as shown in FIG. 35, a similar report is made if the tangent to the initial end is greater than $\beta$ and if the tangent to the terminal end is greater than $\alpha$.

The above decisions are made within the control device of the machining data preparing section according to a flow chart shown in FIG. 36.

That is, when an instruction to find the tool path is issued upon completion of the inputting of the tool code number and machining shape, such decision is started and made for each machining pattern.

First, in the case of a taper in FIG. 33, if the coordinates of A, B, C and D are given as $A(X_A, Z_A)$, $B(X_B, Z_B)$, $C(X_C, Z_C)$ and $D(X_D, Z_D)$, respectively, then the gradient tan $\sigma$ of the line segment AB is tan $\sigma = (X_A - X_B)/-(Z_B - Z_A)$, and only when it is equal to or greater than tan $\beta$, an error representation is given, and when otherwise, it is decided to be NO, namely, not an error. The gradient tan $\lambda$ of the line segment CD is tan $\lambda = (X_D - X_C)/-(Z_D - Z_C)$, and only when it is equal to or greater than tan $\alpha'$, it is decided to be an error, and when otherwise, it is decided not to be an error.

In addition, the above description refers to cases where the gradient of the line segment is taken into consideration. However, if it is not taken into consideration, said error representation can be made by deciding whether the cutting angle $\alpha$ and the end-cutting-edge angle $\beta$ interfere with each other, as shown in a flow chart in FIG. 37.

That is, in the case of the machining of a workpiece having taper portions at two places such as line segments AB and CD in FIG. 33, such taper portions are individually considered. Thus, the gradient tan $\sigma$ of the taper portion indicated by the line segment AB is tan $\sigma = (X_A - X_B)/(Z_A - Z_B)$. Only when tan $\sigma \geq \tan \beta'$ and $-\tan \sigma \geq \tan \alpha'$, it is decided to be an error and when otherwise, it is decided not to be an error.

The gradient tan $\lambda$ of the taper portion indicated by the line segment CD is tan $\lambda = (X_C - X_D)/(Z_C - Z_D)$. In this case, only when tan $\lambda \geq \tan \beta'$ and $-\tan \lambda \geq \tan \alpha'$, it is decided to be an error, and when otherwise, it is decided not to be an error.

In the case of a convex circle, in FIG. 34, if the coordinates of points A and B are given by $A(X_A, Z_A)$ and $B(X_B, Z_B)$, respectively, and if the radius of the arc is given by R, then the gradient tan $\lambda'$ of the tangent at point A is tan $\lambda' = -(Z_R - Z_A)/(X_A - X_R)$, and only when tan $\lambda'$ is greater than tan $\alpha$, it is decided to be an error, and when otherwise, it is decided not to be an error. The gradient tan $\sigma'$ of the tangent at point B is tan $\sigma' = -(Z_B - Z_R)/(X_B - X_R)$, and only when tan $\sigma'$ is greater than tan $\beta$, it is decided to be an error, and when otherwise, it is decided not to be an error.

Further, in the case of a concave circle, in FIG. 35, if the coordinates of points A and B are given by $A(X_A, Z_A)$ and $B(X_B, Z_B)$, respectively, and if the radius of the arc is given by R, then the gradient tan $\lambda''$ of the tangent at point A is tan $\lambda'' = -(Z_R - Z_A)/(X_A - X_R)$, and nly when tan $\lambda''$ is greater than tan $\beta'$, it is decided to be an error, and when otherwise, it is decided not be an error. The gradient tan $\sigma''$ of the tangent at point B is tan $\sigma'' = (Z_B - Z_R)/X_B - X_R)$, and only when tan $\sigma''$ is greater than tan $\alpha'$, it is decided to be an error, and when otherwise, it is decided not to be an error.

Said $X_R$ and $Z_R$ are the coordinates of the center of the arc and are automatically computed inside the control device of the machining data preparing section from the inputted values, as follows.

$$X_R = \{a + d(a-b) \pm \sqrt{q}\}/(d^2 + 1)$$

(where the double sign means that minus (−) is applied to convex circle and that plus (+) is applied to concave circle)

$$Z_R = d \cdot X_R + a$$

where $$q = \{a + d(a-b)\}^2 - (d^2 + 1)(2a^2 + b^2 - C^2 - 2ab)$$

$$a = X_A - X_B$$

$b = Z_Z - Z_B$ $c = R$(Radius of convex or concave circle; inputted value)

$d = (X_A - X_B)/(Z_B - Z_A)$.

As described above, according to the invention, it is only necessary for the operator to input the code number of the tool to be used and the machining size as it is, whereupon the control device automatically corrects the machining shape to suit said tool. Further, mistakes in inputting data can be detected, thus lessening the labor of the operator and enabling high precision NC machining to be carried out with ease.

The method of compensating the path of movement of said tool according to the nose radius of the tool will now be described.

Figure 38:
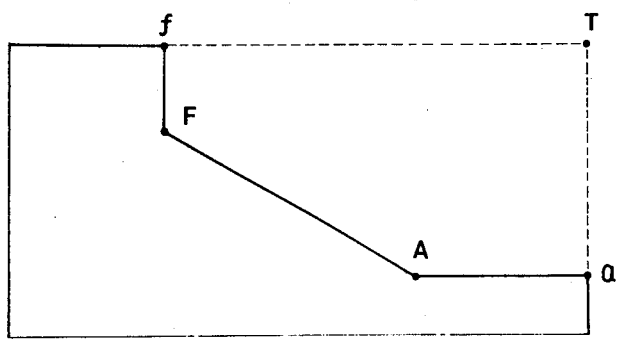
FIG. 38 is a diagram showing an example of a machining shape, on which data is inputted into a control device.

Generally, when it is desired to machine a workpiece of, e.g., cylindrical shape, into a shape as shown in FIG. 38 on a lathe whose movement is numerically controlled, the operator usually inputs the X and Z coordinates of the cutting point T, start point A, and end point F into a control device comprising a microcomputer 17. Then, The microcomputer, as described above, computes the path of movement of the tool taken during rough machining, rough finish machining and finish machining, on the basis of said data and controls the lathe according to the results of the computations. For example, in the case of finish machining, it computes the coordinates of point a and f from said data and controls the finishing tool so that the cutting edge of the tool moves on a line which connects points a, A, F and f.

Figure 39:
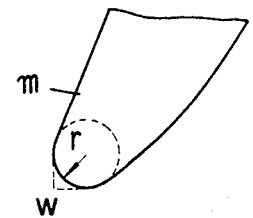
FIG. 39 is an enlarged diagram of the cutting edge of a tool used in lathes.

In this connection, it is to be noted that the cutting edge of a tool used with the lathe has not a pointed apex and, actually, it is arcuate, as shown in FIG. 39. In order to control the path of movement of the tool m by the method described above, therefore, it is necessary to fix some point of the cutting edge as a control point. To this end, conventionally, as shown in FIG. 39, an imaginary cutting edge W is determined for each tool on the basis of the nose radius r and is controlled so that it moves on the line connecting points a, A, F and f which are computed by the microcomputer.

Figure 40:
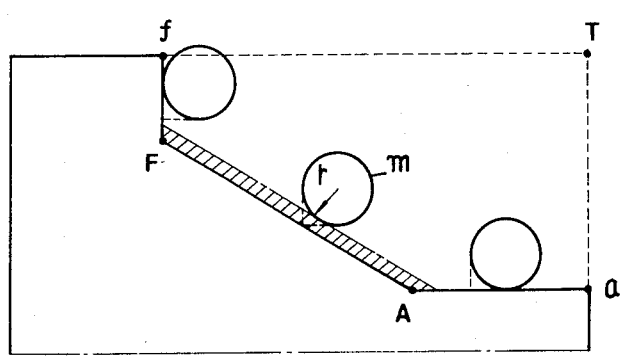
FIG. 40 is a diagram showing a workpiece machined without nose radius compensation.

Control of the movement of the tool m according to such imaginary cutting edge W presents no problem in connection with regions between points a and A and between points F and f. However, in a region between points A and F on the taper surface, the actual cutting edge of the tool m moves on a dash-dot line, as shown in FIG. 40, thus leaving the shaded portion uncut.

Figure 41:
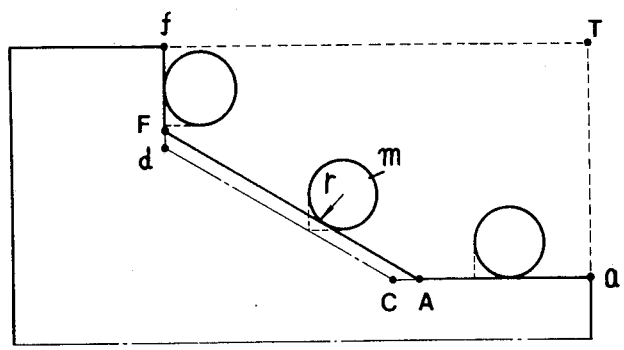
FIGS. 41 and 42 are diagrams showing workpieces machined with nose radius compensation.

Thus, in the past, as shown in FIG. 41, a nose radius correction method has been put into practical use, wherein the path c→d described by the imaginary cutting edge W when the actual cutting edge moves between points A and F on the taper surface is computed from the X coordinates of the cutting point T, start point A and end point F and from the nose radius r of the tool so as to control the imaginary cutting edge W of the tool m so that it moves on a path which connects points a, c, d and f, thereby correctly machining the taper surface.

In addition, the X and Z coordinates of points c and d are computed as follows.

Let the X and Z coordinates of point A be X(A) and Z(A), respectively, the X and Z coordinates of point F be X(F) and Z(F), respectively, the X and Z coordinates of point T be X(T) and Z(T), respectively, and the nose radius of the tool be r. Then, $X(a) = X(A)$
$Z(a) = Z(T)$
$X(c) = X(A)$ $$Z(c) = Z(A) - \frac{r\{Z(A) - Z(F) + X(F) - X(A) - \sqrt{(Z(A) - Z(F))^2 + (X(F) - X(A))^2}\}}{X(F) - X(A)}$$

$$X(d) = X(F) - \frac{r\{Z(A) - Z(F) + X(F) - X(A) - \sqrt{(Z(A) - Z(F))^2 + (X(F) - X(A))^2}\}}{Z(A) - Z(F)}$$

$Z(d) = Z(F)$
$X(f) = X(T)$
$Z(f) = Z(F)$.

Figure 42:
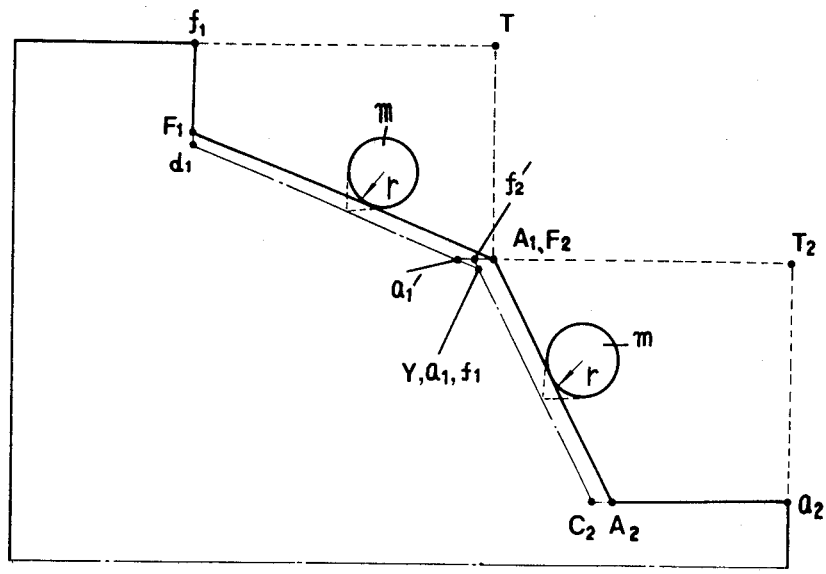

Further, when it is desired to machine a shape in which taper surfaces are connected together, as shown in FIG. 42, (for the convenience of description, of the two contiguous machining steps, the one on the left-hand side with respect to the axis of the workpiece is referred to as the first machining step and the other the second machining step), first, the path $a_1'—d_1—f_1$ along with the imaginary cutting edge is moved is found by the same method as described above on the basis of the inputted data, namely, the X and Z coordinates of the cutting point $T_1$, start point $A_1$ and end point $F_1$ and the radius r of the tool. Next, the path $a_2—c_2—f_2'$ along which the imaginary cutting edge is moved is found by the same method as described above on the basis of the inputted data, namely, the X and Z coordinates of the cutting point $T_2$, start point $A_2$ and end point $F_2$ and the nose radius r of the tool. The intersection Y between an extension of the line segment $a_1'—d_1$ and the line segment $c_2—f_2'$ is then found from the data on said two paths, and after cancelling the previously found start point $a_1'$ of the first machining step and the end point $f_2'$ of the second machining step, said point Y is set as the new start point $a_1$ of the first machining step and the end point $f_2$ of the second machining step. Thus, the imaginary cutting edge of the tool m is moved on the path which connects points $a_2$, $c_2$, $f_2$, $a_1$, $d_1$, and $f_1$, whereby the workpiece is machined to the given shape.

Figure 43:
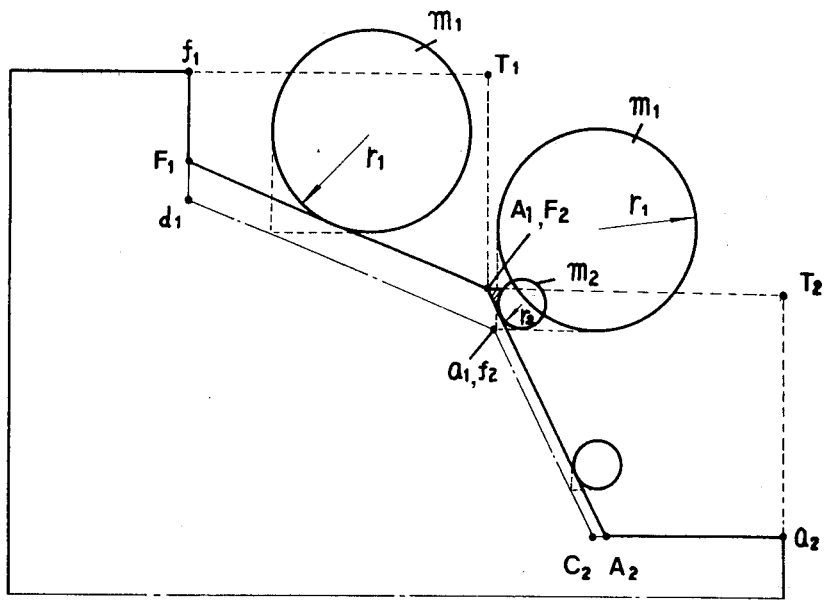
FIGS. 43 and 44 are diagrams showing two successive steps performed by using two kinds of tools according to a conventional nose radius compensation method.
Figure 44:
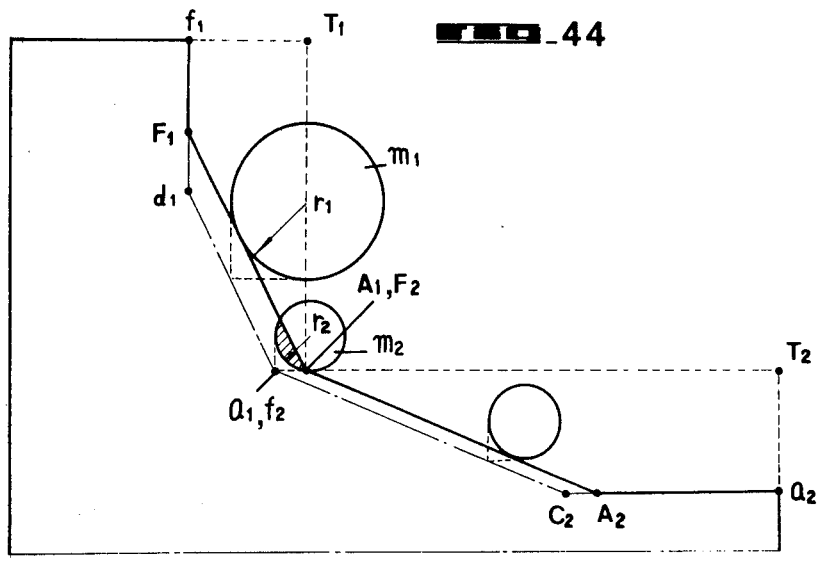

However, if the tool $m_1$ for the first machining step and the tool $m_2$ for the second machining step differ from each other and their nose radii $r_1$ and $r_2$ differ from each other and when it is desired to machine a portion having taper surfaces connected together, the use of said method for finding the path along which the imaginary cutting edge moves would result in this, that as shown in FIG. 43 the tool $m_2$ would not move to the end point for the second machining step, thus leaving the shaded portion uncut or as shown in FIG. 44 the tool $m_2$ would cut into the inside of the machining shape, thus overcutting the shaded portion.

Therefore, the present invention uses the following method for finding the path of movement of the imaginary cutting edge necessary for cutting in the second machining step with two kinds of tools having different nose radii.

Figure 45:
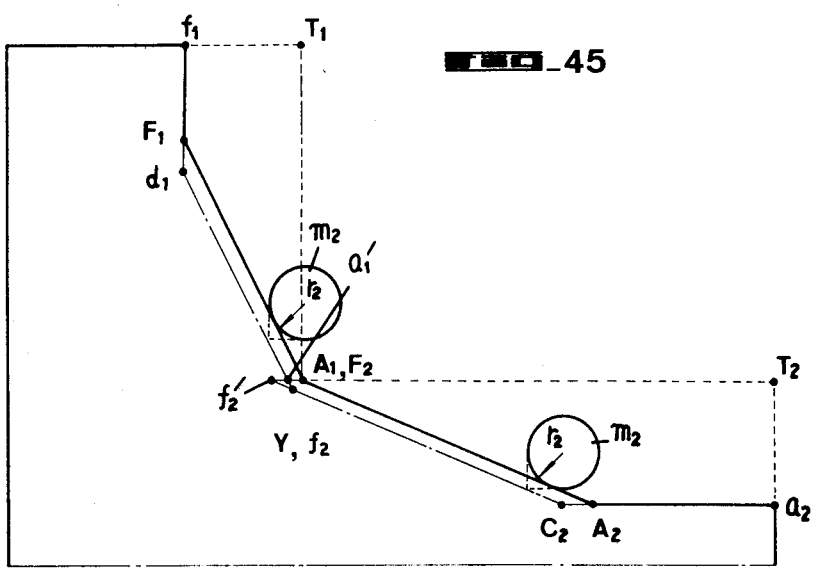
FIGS. 45, 46, 47, 49 and 50 are diagrams showing two successive steps performed by using two kinds of tools according to the control method of the invention.
Figure 46:
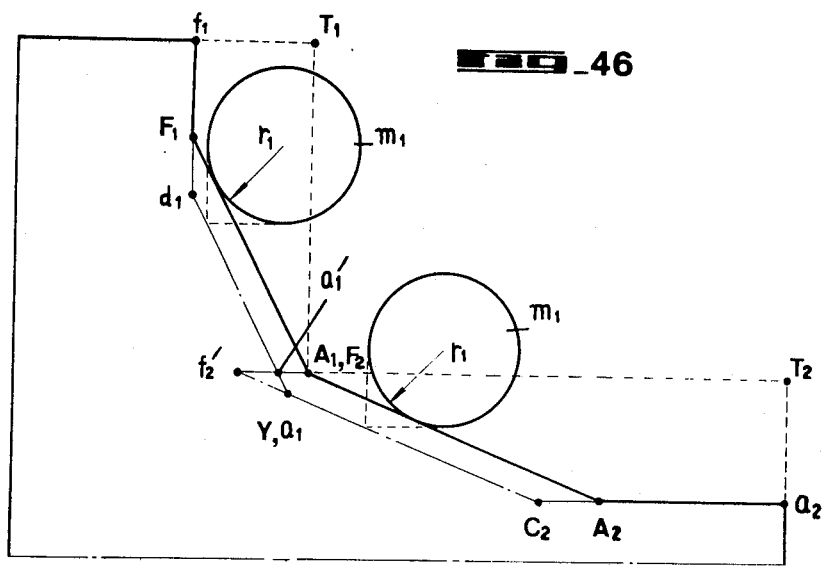
Figure 48:
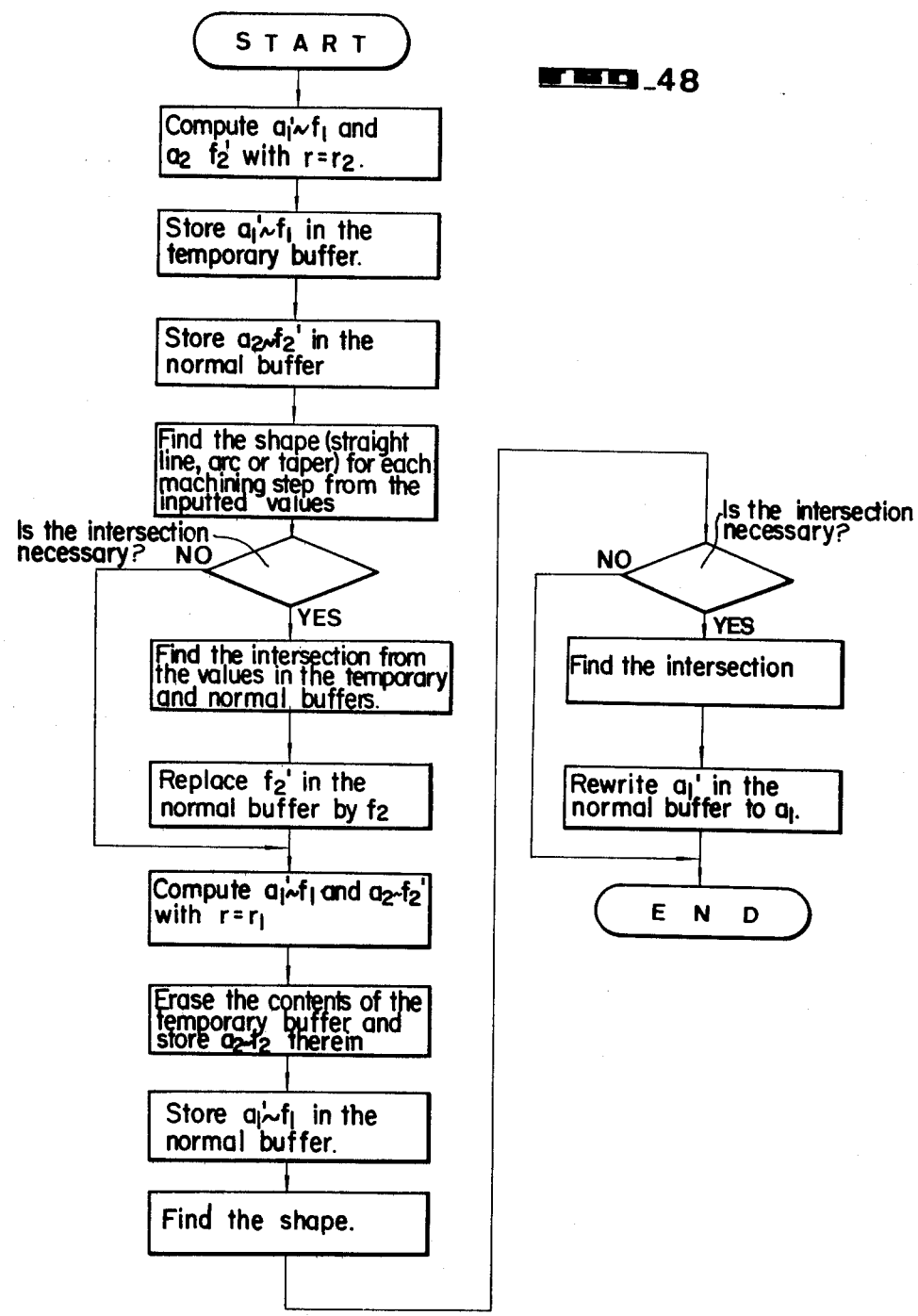
FIG. 48 is a flow chart illustrating a control method according to the invention.

Suppose that the tool $m_2$ for the second machining step is used for both the first and second machining steps, as shown in FIGS. 45 and 48. Further, let the nose radius r of the tool be $r_2$. Then, as in conventional methods, the paths of movement $a_2$—$c_2$—$f_2'$ and $a_1'$—$d_1$—$f_1$ of the imaginary cutting edge of the tool $m_2$ necessary for cutting by the tool $m_2$ in the first and second machining steps are found, and the path of movement $a_1'$—$d_1$—$f_1$ is stored in the temporary buffer of the microcomputer and the path of movement $a_2$—$c_2$—$f_2'$ in the normal buffer of the microcomputer. The shape (straight line, arc or taper) to be cut in each machining step is found on the basis of the data inputted into the microcomputer, and then it is decided whether it is necessary to find the intersection between the path of movement of the imaginary cutting edge for the first machining step and the path of movement of the cutting edge for the second machining step. If this is necessary, the intersection Y between an extension of the line segment $a_1'$—$d_1$ and the line segment $c_2$—$f_2'$ is found on the basis of the data stored in the temporary and normal buffers, and the data on the end point $f_2'$ for the second machining step stored in the normal buffer is cancelled and the point Y is stored as the new end point $f_2$ for the second machining step.

Figure 47:
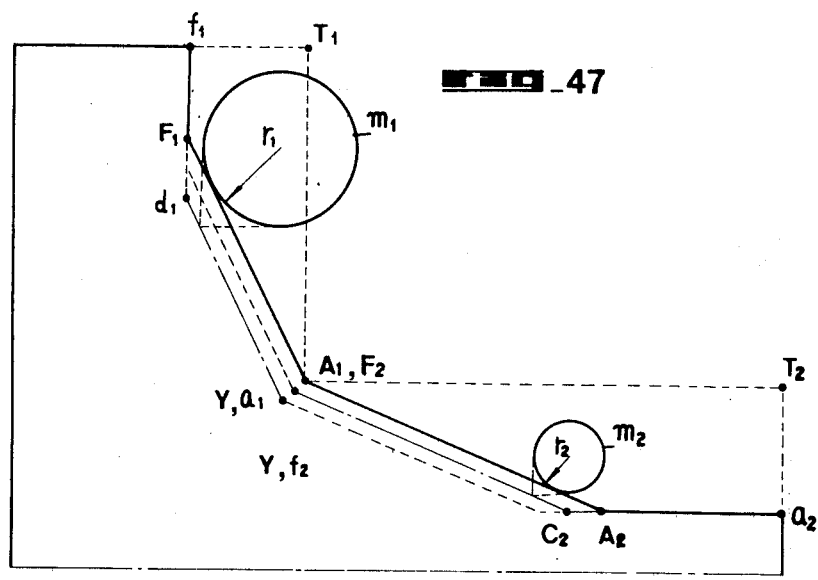

Next, as shown in FIG. 4b, suppose that the tool $m_1$ for the first machining step is used for both the first and second machining steps and set $r=r_1$. The paths of movement $a_2$—$c_2$—$f_2'$ and $a_1'$—$d_1$—$f_1$ of the imaginary cutting edge of the tool $m_1$ necessary for machining by the tool $m_1$ in the first and second machining steps are then found by the same method as in the conventional example described above, and after the contents of the temporary buffer of the microcomputer are erased, the path of movement $a_2$—$c_2$—$f_2'$ thus found is stored in the temporary buffer, while the path of movement $a_1'$—$d_1$—$f_1$ thus found is stored in the normal buffer. The machining shape for each machining step is then found on the basis of the data inputted into the microcomputer, and it is decided whether it is necessary to find the intersection between the path of movement of the imaginary cutting edge for the first machining step and the path of movement of the imaginary cutting edge for the second machining step. If this is necessary, the intersection Y between an extension of the line segment $a_1'$—$d_1$ and the line segment $c_2$—$f_2'$ is found on the basis of the data stored in the temporary buffer and the data stored in the normal buffer, and after the data on the start point $a_1'$ of the first machining step stored in the normal buffer has been canceled, said point Y is stored as the new start point $a_1$ of the first machining step. In this way, the storage of the path of movement $a_1$—$d_1$—$f_1$ of the imaginary cutting edge for the first machining step and the path of movement $a_2$—$c_2$—$f_2$ of the imaginary cutting edge for the second machining step is completed, as shown in FIG. 47. Thereafter, it is only necessary to control the lathe so that the imaginary cutting edge of the second tool $m_2$ moves on the path $a_2$—$c_2$—$f_2$ and the cutting edge of the first tool $m_1$ moves on the path $a_1$—$d_1$—$f_1$, whereby accurate machining can be performed with two tools having a different nose radius in two contiguous machining steps.

In addition, in the foregoing description, the tool has been described as moving from right to left in each machining step or the start point of each machining step is situated on the right-hand side and the end point thereof on the left-hand side, but in the case of moving the tool from left to right, said start point may be stored as the end point and said end point as the start point.

Figure 49:
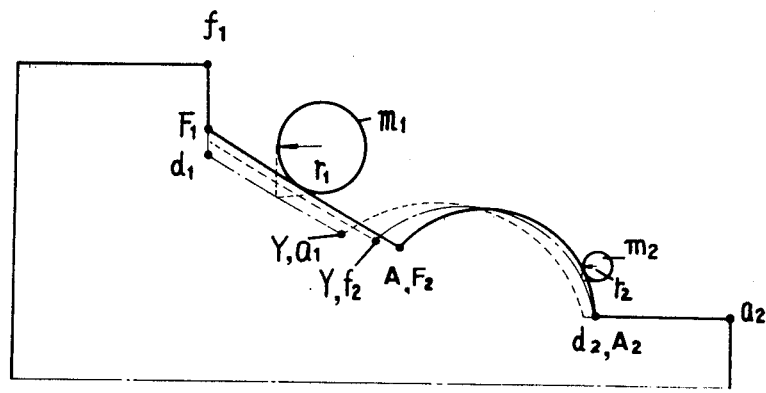
Figure 50:
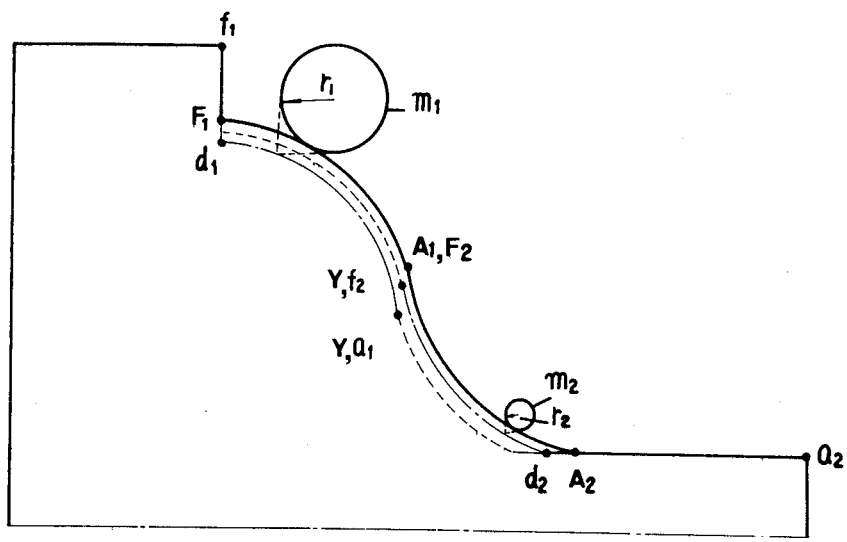

Further, even in the case of a combination of an arc and a taper or of two arcs to be machined in two contiguous machining steps by two tools having a different nose radius, as shown in FIGS. 49 and 50, the path of movement $a_1 \sim f_1$ of the imaginary cutting edge in the first machining step and the path of movement $a_2 \sim f_2$ of the imaginary cutting edge in the second machining step can be found by the same method as described above so as to accurately machine the workpiece to the given shape.

What is claimed is:

1. A method of control of NC machine tools of the type wherein all control data necessary for preparing machining data is inputted into a computer control device by key switches provided on an operating control panel, said control device having a memory means divided into a plurality of input buffers each associated with a different workpiece and a single machining buffer assembly, said method comprising the steps of:
   inputting into said input buffers common data necessary for machining workpieces and machining step data necessary for computing the paths of movement of tools;
   successively computing the data necessary for machining any selected workpiece on the basis of the data stored in the input buffer associated with the selected workpiece; and
   transferring the results of the computations to said machining buffer assembly for use in controlling the machining of the workpiece, such that the workpiece is machined to a predetermined shape on the basis of said computed data.

2. A method of control of NC machine tools of the type wherein all control data necessary for preparing machining data is inputted by key switches provided on an operating control panel, and wherein a machining shape to which a workpiece is to be finished has a continuous contour comprising a combination of n simple unit shapes, each of which is machined in one machining step wherein said machining shape may be machined in n machining steps starting at one end of said machining shape and ending at the other end thereof, said method comprising the steps of:
   computing, for storage in a finishing buffer, each said simple unit shape, the start point, end point, center point, and radius in each machining step to produce instruction data for moving the finishing tool;
   computing, for storage in a rough finishing buffer, the rough finish start point, end point, center point, and radius in each machining step for each machining step with a finishing allowance depending upon the respective simple unit shape being added to the value stored in said finishing buffer for each machining step, to produce instruction data for moving the rough finishing tool; and
   recomputing, for storage in a rough machining buffer, the rough machining start point, end point, center point, and radius by subtracting the amount of cut for each machining step from the machining allowance which is then added to the values stored in said rough finishing buffer which corresponds to the last machining step, to produce instruction data for moving the rough machining tool in an updated manner for each machining step, thereby repeatedly performing rough machining a number of times equal to the quotient obtained by dividing the machining allowance by the amount of cut, rough finish machining including any remainder in the division.

3. A method of control of NC machine tools of the type wherein all control data for preparing machining data is inputted into a control device by key switches provided on an operating control panel, said method comprising the steps of:
  dividing the machining shape pattern into an open portion and an on-the-way concave portion;
  dividing each of said portions into a straight line, taper, convex arc, and concave arc;
  inputting data corresponding to said divided portions into said control device;
  fixing the instruction patterns within the control device for moving the tool in a repetitive quick return movement opposite the cutting direction via the feed direction to the start point of feed;
  inputting the machining shape into the control device as one or a combination of said patterns;
  inputting the common data and machining step data necessary for machining; and
  successively internally computing the cutting paths for rough machining corresponding to shapes to be machined from said inputted data.

4. A method of control of NC machine tools of the type wherein all control data necessary for preparing machining data is inputted into a control device by key switches provided on an operating control panel, comprising the steps of:
  inputting into a machining data preparing section of the control device data code numbers and corresponding tool data, each code number corresponding to one of a plurality of tools, each tool differing in cutting angle and end-cutting-edge angle, wherein tool data on each tool is retrievable;
  inputting into said machining data preparing section data shape data corresponding to a pattern of machining shape to be machined by each selected tool and the amount of cut; and
  automatically determining an optimum tool path for a selected tool using said tool data and said shape data such that any interference of the tool with the workpiece is avoided.

5. A method as claimed in claim 4, further comprising the steps of:
  comparing the inputted shape data with the tool data for determining whether it is possible to perform an intended machining by said tool; and
  providing an indication if said machining cannot be performed.

6. A method of control of NC machine tools of the type wherein all control data necessary for preparing machining data is inputted into a control device, and a workpiece is machined by first and second tools which differ in nose radius in two successive machining steps, said method comprising the steps of:
  finding first and second paths of movement of an imaginary cutting edge, one for each machining step on the assumption than said first tool is used for both machining steps;
  finding the intersection between the first and second paths of movement, said intersection being used as the start point or end point of the path of movement of the first tool;
  finding third and fourth paths of movement of an imaginary cutting edge for each machining step on the assumption that said second tool is used for both machinig steps; and
  finding the intersection between the third and fourth paths of movement, said intersection being used as the start point or end point of the path of movement of the second tool in association with the start point or end point of said first tool, whereby the movement of the first and second tools is controlled.

* * * * *